United States Patent
Eichenberger et al.

(10) Patent No.: US 8,458,442 B2
(45) Date of Patent: Jun. 4, 2013

(54) METHOD AND STRUCTURE OF USING SIMD VECTOR ARCHITECTURES TO IMPLEMENT MATRIX MULTIPLICATION

(75) Inventors: Alexandre E. Eichenberger, Chappaqua, NY (US); Michael Karl Gschwind, Chappaqua, NY (US); John A. Gunnels, Yorktown Heights, NY (US); Fred Gehrung Gustavson, Briarcliff Manor, NY (US); Brett Olsson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 12/548,129

(22) Filed: Aug. 26, 2009

(65) Prior Publication Data

US 2011/0055517 A1    Mar. 3, 2011

(51) Int. Cl.
  *G06F 15/00* (2006.01)
  *G06F 15/76* (2006.01)
(52) U.S. Cl.
  USPC ............................................ 712/213; 712/22

(58) Field of Classification Search
  None
  See application file for complete search history.

(56) References Cited

U.S. PATENT DOCUMENTS

| | | | |
|---|---|---|---|
| 5,812,147 A * | 9/1998 | Van Hook et al. | 345/537 |
| 5,933,650 A * | 8/1999 | van Hook et al. | 712/2 |
| 2007/0271415 A1* | 11/2007 | Ramchandran | 711/118 |

* cited by examiner

*Primary Examiner* — Corey S Faherty
(74) *Attorney, Agent, or Firm* — Daniel P. Morris; McGinn IP Law Group, PLLC

(57) ABSTRACT

A structure (and method) including a plurality of coprocessing units and a controller that selectively loads data for processing on the plurality of coprocessing units, using a compound loading instruction. The compound loading instruction includes a plurality of low-level software instructions that preliminarily processes input data in a manner predetermined to simulate an effect of a single hardware loading instruction that would provide optimal loading of complex matrix data by loading input data in accordance with the effect of multiplying $i \cdot i = -1$.

24 Claims, 16 Drawing Sheets

FIGURE 3a

```
NOTE: VM11 holds (-one,one,...,-one,one)
DO j=0,nb-1
  DO i=0, m1-1
    Form U = (bd₀,bc₀,...,bd_{v-1},bc_{v-1}) from VRC(i,j) and VRC1(i,j)
      (This is a vector select operation);
    Form VC1(i,j) = (ac₀,ad₀,...ac_{v-1},ad_{v-1}) from VRC(i,j) and VRC1(i,j)
      (This is also a vector select operation);
    Form VRC1(i,j) += U·VM11;
    VRC1(i,j) = ((ac-bd)₀, (ad+bc)₀, ... (ac-bd)_{v-1},(ad+bc)_{v-1})
    Load VRC(i,j) = (e₀,f₀,...e_{v-1},f_{v-1}) from memory;
    Form VRC(i,j) = VRC(i,j) + VRC1(i,j);
    Store VRC(i,j) back to memory;
  Enddo
Enddo
```

FIGURE 3b

```
DO L= 0, kb-1
  load m1 VRAs with A(0:mb-1, L) = (a₀,b₀,..., a_{mb-1},b_{mb-1}):
    i.e., VRA(i) = (a_{iv}, b_{iv},...,a_{iv+v-1},b_{iv+v-1});
  load m1 VRA1s, i.e. VRA1(0:m1-1), such that
    VRA1(i) = (b_{iv},a_{iv}, ...,b_{iv+v-1},a_{iv+v-1})
  load nb VRBs with B(L, 0:nb-1) = (c₀,d₀,c₁,d₁, ..., c_{nb-1},d_{nb-1})
    such that, for VRB(0:nb-1), the ith VRB(i) holds (c_i,d_i)
            repeated v times;
  perform m1·nb VMX FMAs: VRC(i, j) += VRA(i) ·VRB(j);
  perform m1·nb VMX FMAs: VRC1(i,j) += VRA(i) ·VRB1(j);
enddo
```

FIGURE 4a

```
      NOTE: VM11 holds (-one,one,...,-one,one)
DO j=0,nb-1
  DO i=0, m1-1
    VRC1(i,j) = (bd₀,bc₀,...bd_{v-1},bc_{v-1}); [case 3]
    VRC(i,j) += VRC1(i,j)·VM11
      Now, VRC(i,j) =((ac-bd)₀, (ad+bc)₀, ... (ac-bd)_{v-1},(ad+bc)_{v-1});
    Load VRC1(i,j) = (e₀,f₀,...e_{v-1},f_{v-1}) from C_{ReB};
    Form VRC(i,j) = VRC(i,j) + VRC1(i,j);
    Store VRC(i,j) back to C_{ReB};
  Enddo
Enddo
      NOTE: VRC1(i,j) = (bd₀,ad₀,...bd_{v-1},ad_{v-1}); [case 4]
```

FIGURE 4b

```
DO L= 0, kb-1
  load m1 VRAs with A(0:mb-1, L) = (a₀,b₀,...a_{mb-1},b_{mb-1}):
    i.e., VRA(i) = (a_{iv}, b_{iv},... a_{iv+v-1},b_{iv+v-1});
  load m1 VRA1s, i.e. VRA1(0:m1-1), such that
    VRA1(i) = (b_{iv},a_{iv}, ... b_{iv+v-1},a_{iv+v-1})
  load nb VRBs with B(L, 0:nb-1) = (c₀,d₀,c₁,d₁, ... , c_{nb-1},d_{nb-1})
    such that, for VRB(0:nb-1), the ith VRB(i) holds (c_i,d_i)
repeated v
    times;
  perform m1·nb VMX FMAs: VRC(i, j) += VRA(i) ·VRB(j)
                          VRA1(i,j) += VRA(i) ·VRB1(j);
enddo
```

FIGURE 7                              700

(Box 703b corresponding to Box 303b)          703a

```
DO L=0,kb-1
  ! Loading VAs and VA1s
  do i=0,m1-1
     VA(i) = A_ReB(iv:iv+v+1,L)=(a_0,b_0,...a_{v-1},b_{v-1})
     Form VA1(i) = (b_0,a_0,...,b_{v-1},a_{v-1}) from VA(i)
  enddo
  ! Loading VBs
  do j=0, n1-1
     VB(j) = B^T_ReB(i,iv,iv+v-1) = (c_0,d_0,..., c_{v-1},d_{v-1})
  enddo
  ! Execute m1· nb vector scalar FMAs
  do j=0,n1-1
     do jj=0,v-1
        s(0) = VB(jj+jj,j)
        s(1) = VB(jj+jj+1,j)
        do i=0, m1-1
           do ii=0, vL-2,2
              VC (ii, i, jj, j) += VA(ii,i)*s(0)
              VC (ii+1, i, jj, j) += VA(ii+1,i)*s(1)
              VC (ii, i, jj, j) += VA1(ii,i)*s(1)
              VC (ii+1, i, jj, j) += VA1(ii+1,i)*s(0)
           enddo
        enddo
     enddo
  enddo
enddo
```

(Box 803b corresponding to Box 403b)    803b

```
DO L=0,kb-1
  ! Loading VAs and VA1s
  do i=0,m1-1
```
$\quad\quad VA1(i) = A_{ReB}(iv:iv+v+1,L)=(a_0,b_0,\ldots a_{v-1},b_{v-1})$
$\quad\quad$ Form $VA(i) = (a_0,b_0,\ldots,a_{v-1},b_{v-1})$ and
$\quad\quad\quad VA1(i) = (b_0,a_0,\ldots,b_{v-1},a_{v-1})$ from $VA1(i)$
```
  enddo
  ! Loading VBs
  do j=0,n1-1
```
$\quad\quad VB(j) = B_{ReB}{}^\wedge T(L, iv:iv+v-1)=(c_0,d_0,\ldots,c_{v-1},d_{v-1})$
```
  enddo
  ! execute m1*nb vector scalar FMAs
  do j = 0, n1-1
    do jj=0,v-1
        s(0) = VB(jj+jj,j)
        s(1) = VB(jj+jj+1,j)
        do i=0, m1-1
            do ii=0, vL-2,2
                VC (ii, i, jj, j) += VA(ii,i)*s(0)
                VC (ii+1, i, jj, j) += VA(ii+1,i)*s(1)
                VC1 (ii, i, jj, j) += VA1(ii,i)*s(0)
                VC1 (ii+1, i, jj, j) += VA1(ii+1,i)*s(1)
            enddo
        enddo
    enddo
  enddo
enddo
```

FIGURE 9
(Box 903b corresponding to Box 503b) 900

903b

```
Now compute C = sum over kb of (a+b, a-b)*(c,d)
V1M1 = (one, -one, ..., one, -one)
DO L=0,kb-1
   ! Load VAs with A(0:mb-1,L)
   do i=0,m1-1
      VA1(i) = A_ReB(iv:iv+v+1,L)=(a_0,b_0,...a_{v-1},b_{v-1})
      ! Form VA(i), VA2(i) from VA1(i)
         VA(i) = (a_0,a_0,...,a_{v-1},a_{v-1}) and
         VA1(i) = (b_0,b_0,...,b_{v-1},b_{v-1})
         ! Use VA(i), VA2(i), and V1M1 to form new VA(i)
         VA(i) += VA2(i)*V1M1
         VA(i) = (a_0+b_0, a_0-b_0, ..., a_{v-1}+b_{v-1}, a_{v-1}-b_{v-1})
   enddo
   ! Load VBs with B^T(L,0:nb-1)
   do j=0,n1-1
      VB(j) = B_ReB^T(L, jv:jv+v-1)=(c_0,d_0,...,c_{v-1},d_{v-1})
   enddo
   ! execute m1*nb vector scalar FMAs
   ! for peak need m1*nb ≥ 3*m1 + n1 + nb
   do j=0,n1-1
      do jj=0,v-1
         s(0) = VB(jj+jj,j)
         s(1) = VB(jj+jj+1,j)
         do i=0, m1-1
            do ii=0, vL-2,2
               VC (ii, i, jj, j) += VA(ii,i)*s(0)
               VC (ii+1, i, jj, j) += VA(ii+1,i)*s(1)
            enddo
         enddo
      enddo
   enddo
enddo
```

FIGURE 10

(Box 1003 corresponding to Box 603)

```
DO L=0,kb-1
   ! Load VAs with A_ReB(0:mb-1,L)
   do i=0,m1-1
      VA(i) = A_ReB(i*vL:i*vL+vL-1,L)
   enddo
   ! load VBs with B_ReB^T(L,0:nb-1)
   do j=0, n1-1
      VB(j) = B_ReB^T(L,j*vL:j*vL+vL-1,L)
   enddo
   ! execute m1*nb vector scalar FMAs
   do j=0,n1-1
      do jj=0, vL-1
         s = VB(jj,j)
         do i=0,m1-1
            do ii=0,vL-1
               VC(ii,i,jj,j) +=VC(ii,i,m1,jj,j) + VA(ii,i)*s
            enddo
         enddo
      enddo
   enddo
enddo
```

METHOD AND STRUCTURE OF USING SIMD VECTOR ARCHITECTURES TO IMPLEMENT MATRIX MULTIPLICATION

BACKGROUND OF THE INVENTION

1. Field of the Invention

The present invention generally relates to achieving near peak performance on a SIMD (Single Instruction Multiple Data) vector machine. Reflecting implementation constraints, many, if not all, of these current machines do not implement a vector times a scalar fused multiply add or a cross load with or without negation instruction as a co-processor unit instruction for its Fused Multiply Add (FMA) units that would provide ideal loading of data for executing the complex or real matrix operation _GEMM, namely C,ZGEMM or S,DGEMM. More specifically, the effect of these instructions for efficient matrix multiplication of complex data is achieved in the present invention, using a plurality of other available instructions to preprocess data in the co-processor unit data registers to be input into pipelined FMAs, by at least one of selectively duplicating real and imaginary parts and selectively reversing real and imaginary components or just selectively duplicating real or imaginary parts.

2. Description of the Related Art

The present invention is generally directed to any computer architecture which lacks the hardware instruction or instructions, such as a vector times a scalar fused multiply add or cross load with or without negation instructions, for use in a co-processing unit loading operation for its fused multiply add (FMA) units. It is also directed to any computer architecture in which there is no negative butterfly load instruction, an instruction that that receives operand (a,b) as input, to provide a result (−b, a). These operations are important for loading data for matrix processing in _GEMM when the matrix data consists of complex numbers, since $i^*i=-1$ produces a sign change in the real component of the product, an effect that can be addressed by loading data into the FMA using one or more of these instructions typically not provided in many modern SIMD instruction sets.

General Matrix Multiply (_GEMM) is a subroutine in the Basic Linear Algebra Subprograms (BLAS) which performs matrix multiplication, that is, the multiplication of two matrices with update $C=C\pm A\cdot B$. This includes: SGEMM for single precision, DGEMM for double-precision, CGEMM for complex single precision, and ZGEMM for complex double precision.

Ideally, for optimal efficiency in terms of minimizing the number of instructions, data for vector multiplication using complex numbers would be loaded into vector FMAs using a hardware loading instruction that places the data into the vector FMA correctly to achieve the negation occurring in the real component, so that the vector FMA can then routinely perform vector multiplication that provides this sign change effect for the real component. Without such a data loading hardware instruction for complex numbers, including a negation, the straightforward method to deal with the sign change effect would involve using additional stages of processing, thereby possibly making it less efficient overall.

FIG. 1 exemplarily illustrates a computer architecture 100 suitable for matrix processing. The central processing unit (CPU) 101 executes logical and, possibly, arithmetic operations, but, more typically, in more recent computer architectures, at least one co-processor 102 is attached to the CPU function, as dedicated to specific forms of processing, such as the vector fused multiply add (FMA) unit (e.g., a co-processing unit) exemplarily indicated in FIG. 1. It is noted that co-processor 102 might also be a floating-point unit (FPU) when the vector length is one. Both the CPU 101 and FMA 102 have respective register sets 103, 104 for exchanging data and serving as a workspace, or, more typically, the register set is commonly shared between the CPU and FMA. Typically, in recent SIMD machines, to which the present invention is particularly addressed, there will be more than one CPU 101 and more than one vector FMA unit 102, where the vector FMAs comprise scalar FMAs that are controlled in a pipelined manner to provide processing for each vector component. The present invention is also directed toward machines expected to be selectively able to perform vector multiplication on complex data, thereby adding the complication of achieving the effect of multiplying $i \cdot i = -1$.

Typical architectures will also include one or more levels of cache, such as the L1 cache 106 and L2 cache 107, as well as possibly higher level caches 108, and a main memory 105. It is also noted that the present inventors also refer to the working register set 103, 104 for the CPU/FMA as the "L0 cache."

The precise details of the exemplary architecture are not so important to understanding the present invention so much as understanding that the present invention is directed to modern machines in which the matrix processing uses a co-processor 102 and which the present inventors refer to as a "SIMD machine", which has various forms of "strictness." The architectures to which the present invention include the Power ISA with either a VMX capability or Vector Scalar Extension (VSX) capability, which will be used in examples herein and will be used to provide specific aspects of exemplary embodiments. There are also considered conceptual extensions to these architectures, such as a theoretical VMX extension supporting DP arithmetic.

In another exemplary embodiment, this invention is directed at more generalized SIMD architectures based upon VMX or VSX features, but containing more data elements within a wide vector, and having appropriately adapted instruction sets to compute and rearrange data on such a wide vector exceeding the current VMX or VSX vector width of 128 bits. For purpose of this exposition, these conceptually extended instruction sets may be similarly referred to as VMX or VSX instruction sets without limitation to the applicability of this invention to a wide range of SIMD instruction sets having like features.

In yet other exemplary embodiments, the inventions described herein could be applied to Intel and AMD architecture systems with MMX and/or SSE capabilities, or other processors with data-parallel SIMD processing capabilities.

More precisely, what "strict SIMD machine" means in the context of the present invention is that the co-processor function used to perform vector FMA's has neither vector scalar FMA nor cross load (with or without negation instructions), meaning that there is no vector FMA instructions such that, given received operands (a,b) and (c,d) as inputs, the operand results (−b,a), (c,c) and (d,d) are provided, as would be required for complex matrix multiplication, since multiplication of two complex numbers requires that $(a+bi)(c+di)=(ac-bd)+(bc+ad)i$. For real vector scalar multiplication where $V=(a, b)$ and $s=c$ there is no instruction that produces (ac, bc).

That is, given complex matrices, A and B, respectively, having complex elements $a_{ij}=a+bi$ and $b_{ij}=c+di$, double precision complex matrix multiplication using ZGEMM requires:

$$C = C + / - A \cdot B = c_{ij} + / - a_{ik} \cdot b_{jk} = c_{ij} + / - \left( \begin{array}{c} ac - bd \\ ad + bc \end{array} \right).$$

From the above ZGEMM equation, it can be seen that, as exemplarily demonstrated, a vector FMA consists of two scalar FMAs, one that calculates the real component ac−bd and the other that calculates the imaginary component ad+bc. Each scalar FMA is capable of receiving operands (a,b) and (c,d). It should be clear that there may be additional FMAs, so that vector multiplication on vectors having different vector components can be occurring in parallel.

The advantage of having, for example, the cross load with negation instruction is that it can be used to selectively load the operands for the scalar FMAs to provide the appropriate inputs necessary for the above ZGEMM processing to achieve the effect of the negation of the real component.

The present inventors have recognized that there are possible improvements to further optimize efficient processing of this multiplication as occurring in a "strict SIMD machine" in which there is no hardware vector FMA loading instruction that would automatically load operand data into the vector FMA so that the scalar FMA would provide the negation that results from $i \cdot i = -1$ during complex matrix multiplication, since additional processing of the multiplication result is necessary to achieve this negation effect if there is no hardware loading instruction that provides some form of negation during loading.

Thus, a need exists in such machines lacking such hardware loading instructions for a mechanism to improve efficiency of matrix multiplication using complex data.

SUMMARY OF THE INVENTION

In view of the foregoing, and other, exemplary problems, drawbacks, and disadvantages of the conventional systems, it is an exemplary feature of the present invention to provide a structure (and method) permitting efficient vector matrix multiplication for SIMD architectures of varying degrees of strictness, wherein, for example, there is neither a vector scalar FMA nor a cross load (with/without negation) instruction in the FPU vector instruction set.

It is another exemplary feature of the present invention to use its methods to achieve nearly optimal _GEMM performance on such machines.

It is another exemplary feature of the present invention to provide a structure and method for near peak performance for this important complex operation in the absence of instructions on a SIMD machine with various degrees of strictness.

It is another exemplary feature of the present invention to demonstrate a compensation for the absence of hardware loading instructions desirable for complex arithmetic processing by selectively using existing software instructions, including, particularly, the splat operation and/or vector permute operation (such as exemplarily provided by the popular VMX instruction set) to simulate the effect of a hardware loading instruction that would providing a negation effect upon loading data into the L0 registers.

It is another exemplary feature of the present invention to demonstrate that a plurality of FMAs receiving data from such simulated loading instruction can further be coordinated in a multiplication processing such that the effect of complex multiplication occurs without further processing of the result.

It is yet another exemplary feature of the present invention to demonstrate that the concepts of the present invention can be expanded as a preloading of data into the FMAs that can overcome a loading penalty at the cache/FMA interface.

It is yet another exemplary feature of the present invention to demonstrate that efficiency in a coprocessor having a sufficient number of working registers L0 and appropriate L0 register instructions can be improved by loading a minimal amount of data into the L0 registers and then using the L0 register instructions to preprocess the data for presentation to the coprocessor operation, including augmenting the data as necessary for the coprocessor operation.

It is yet another exemplary feature of the present invention to demonstrate that the above-mentioned efficiency might include intentionally loading incorrect data into the L0 register, so that the preliminary processing will correct the data prior to the coprocessor operation.

It is yet another exemplary feature of the present invention to demonstrate a computer architecture having a coprocessor unit with a working register set L0 wherein the preprocessing occurs during an odd part of the machine cycle and the coprocessor operation occurs during an even part of the machine cycle.

Therefore, in a first exemplary aspect of the present invention, to achieve the above features and objects, described herein is an apparatus including a memory system to store data to be processed; a coprocessing unit to perform an intended processing operation on the data; a set of registers that holds data for the coprocessing unit for the intended processing operation; and a controller that initially loads input data into the set of registers from the memory system and preliminarily processes the loaded data in the set of registers to achieve an effect on the loaded data that is related to the processing operation prior to the data being presented for the intended processing operation.

In a second exemplary aspect, also described herein is a computerized method of performing matrix multiplication including preliminarily processing input data using low-level instructions as part of a loading of input data into data registers of a processing or coprocessing unit of a computer, in accordance with an effect of multiplying $i \cdot i = -1$.

In a third exemplary aspect, also described herein is a method of overcoming an implementation limitation on a computer wherein there is no single hardware loading instruction that would optimally load complex data into data registers for a complex vector multiplication processing, including preliminarily processing input data using low-level instructions as part of a loading of input data into data registers of a processing or coprocessing unit of the computer, in accordance with an effect of multiplying $i \cdot i = -1$.

Thus, the present invention provides a solution for SIMD machines of varying degrees of strictness by providing a software loading mechanism so that vector FMAs on these machines can still be used for complex multiplication, i.e., CGEMM or GGEMM efficiently, since there is no need to perform additional processing to achieve the negation effect inherent in complex multiplication.

BRIEF DESCRIPTION OF THE DRAWINGS

The foregoing and other aspects and advantages will be better understood from the following detailed description of exemplary embodiments of the invention with reference to the drawings, in which:

FIGS. 3, 3A, and 3B illustrate a first exemplary embodiment 300 of the present invention;

FIGS. 4, 4A, and 4B illustrate a second exemplary embodiment 400 of the present invention;

FIG. 7 illustrates a vector scalar first exemplary embodiment 700 of the present invention;

FIG. 8 illustrates a vector scalar second exemplary embodiment 800 of the present invention;

FIG. 9 illustrates a vector scalar third exemplary embodiment 900 of the present invention;

FIG. 10 illustrates a vector scalar DGEMM kernel exemplary embodiment 1000 of the present invention;

DETAILED DESCRIPTION OF EXEMPLARY EMBODIMENTS OF THE INVENTION

Figure 1:
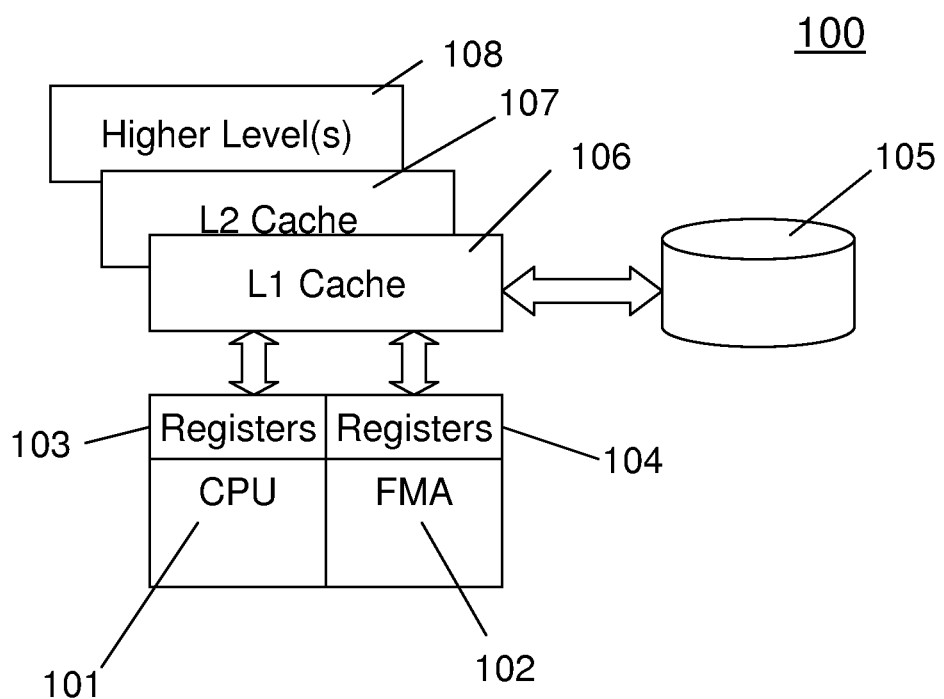
FIG. 1 illustrates a typical computer architecture 100 to explain the present invention.

Referring now to the drawings, and, more particularly, to FIGS. 1-13, exemplary embodiments will now be described.

The present invention overcomes, for example, the lack of either a vector scalar FMA instruction or a negative cross load instruction in a given SIMD architecture, while still achieving near optimal ZGEMM or DGEMM performance. For purpose of this explanation, it is assumed that there are at least some SIMD instructions, such as those discussed below, that can be used for providing these functions of either a vector scalar FMA instruction or a negative cross load instruction, using the special loading procedures described in the various embodiments herein, thereby achieving the effect of one or more specialized loading instructions on data for complex multiplication. By "some", we mean that there is either a vector scalar FMA instruction $y=y+x·s$ or, equivalently, a vector load scalar element $x_i$ of a vector x, where $x_i$ is any component of vector x, or a vector load instruction element pair and a vector load swap element pair instruction.

However, the concept of the present invention is more general than that of simulating the effect of an unimplemented loading instruction, since it also demonstrates that, on newer architectures with a coprocessor having a set of working registers L0 with a set of register instructions, overall calculation efficiency can be enhanced by loading a minimal amount of data, possibly even intentionally loading data incorrectly or incorrect data (wherein "incorrect" is understood as referring to the data layout with respect to its future preferred use), and then using the L0 register instructions to pre-process the data for presentation to the coprocessor operation, including, if necessary, a correction of the input data.

Figure 1A:
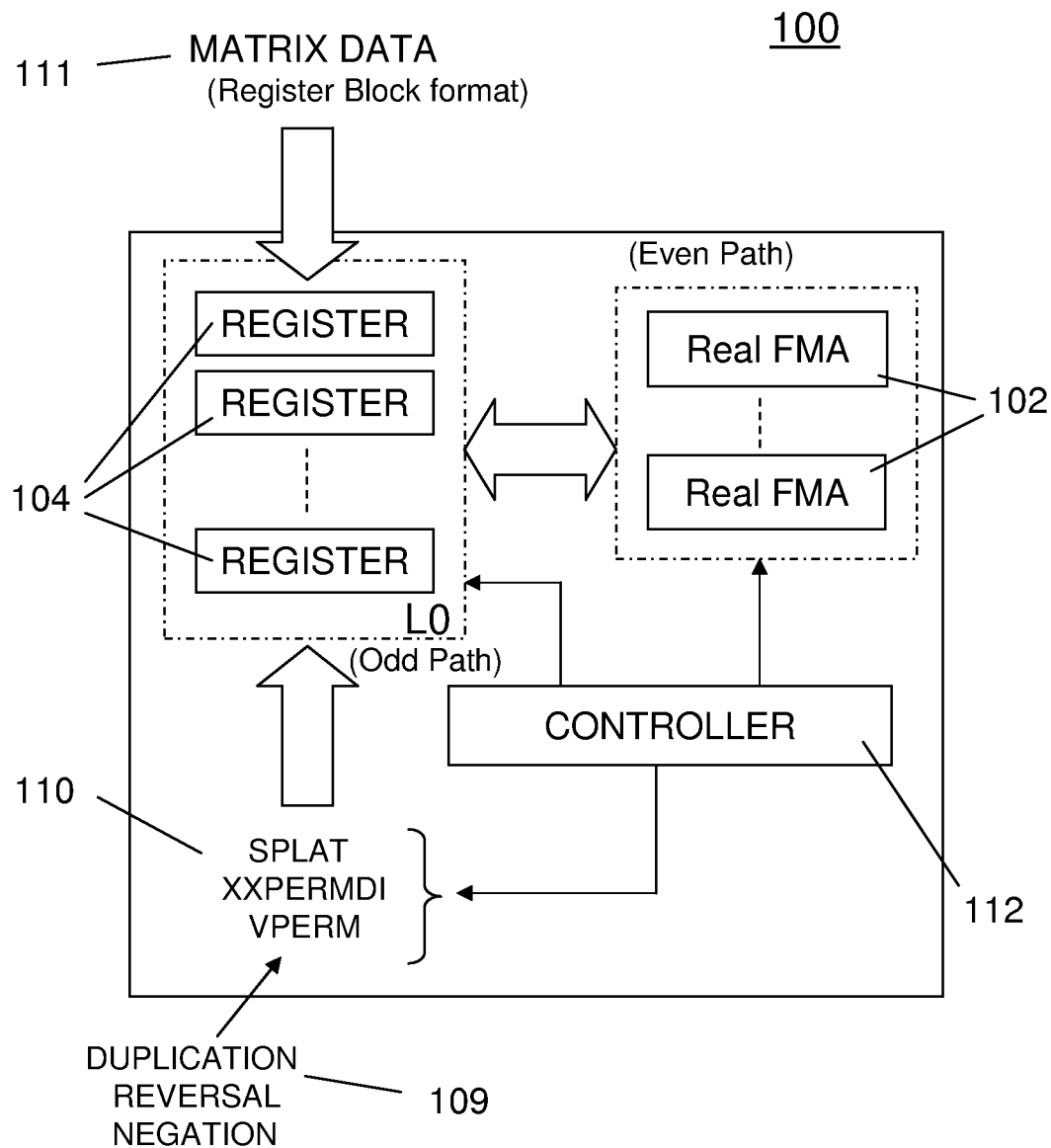
FIG. 1A exemplarily illustrates, as an overview of the various embodiments of the present invention, how the lack on newer computer architectures of a loading instruction optimal for matrix multiplication can be overcome by utilizing other elementary register instructions available to the co-processor controller to rearrange its data registers to hold the same data values that would be produced by the unimplemented instruction (due to implementation considerations to account for implementation characteristics such as wire delay and wiring congestion limiting achievable hardware performance in a modern design), using either software instructions or alternate hardware instructions.

FIG. 1A shows how the various exemplary embodiments of the present invention are interrelated to each other, as well as being related to other inventions previously described by several of the present co-inventors for improving efficiency in matrix multiplication, and for demonstrating the more general concepts of the present invention such as minimal data loading, possibly even intentionally loading data with incorrect data layout (with respect to its future use) in order to be able to load less data from memory into the coprocessor working registers, realizing that the present invention will be able to subsequently correct the data prior to processing the coprocessor operation.

Turning now to FIG. 1A, a plurality of low-level software instructions 110 (e.g., splat, xxpermdi, vperm, as exemplarily implemented by popular SIMD instruction sets such as VMX and VSX) of the co-processing unit 102 and/or L0 register set 104 can be utilized, in the various embodiments described below, for rearranging (pre-loading concept) of the data in L0 prior to vector FMA processing of the data, thereby forming a composite complex loading instruction 109 that permutes the matrix data 111 already loaded in the registers 104 of L0 in a manner that simulates the loading achievable with more direct hardware loading instructions not available on these architectures and that would be expensive to implement. Controller 112 implements the low-level processing 109 as the sequence of L0 register set software instructions discussed shortly in the various embodiments. It is noted that the various software instructions described herein could be alternatively implemented as low-level hardware instructions, with controller 112 selectively controlling these hardware instructions in a corresponding manner as these software sequences.

Barring the existence of these (e.g., splat, xxpermdi, vperm) instructions, the strict SIMD implementation could pre-process the complex data (e.g., using the register block format described in U.S. patent application Ser. No. 10/671, 888), so that the vector load would be correct and no rearrangement within L0 would be necessary. Note that this embodiment of the present invention would require that the data within the register block format be specifically re-arranged to achieve the effect of the unimplemented instruction at the L0 interface. It is noted that this rearrangement of data, as predetermined to achieve a specific purpose as new data for later use in a specific processing, is one of the key characteristics of the register block concept.

The co-processor shown in FIG. 1A, as representative of the newer architectures, actually has dual execution paths, meaning that there is an odd path that can be used for L0 register data formatting instructions and an even path that is used to initiate the FMAs. That is, for every cycle, both L0 move, duplicate, rearrange, or permute functions can be done (odd path) simultaneously with the vector FMA functions (even path). So, in the absence of the optimal loading instruction, the data is incorrectly loaded when complex data is provided for complex multiplication. Then, in accordance with any of the various embodiments of the present invention, the data is corrected in the odd path. Later, the even path executes the now-corrected data as a correct vector FMA.

It is noted in passing, that this delay for correction in L0 is the basis for the pre-loading concept of the invention described in U.S. patent application Ser. No. 10/671,937 on pre-loading, which was then in its infancy. Thus, the various embodiments of the present invention can be considered as an alternative to the pre-loading described in co-pending application, U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS", incorporated herein by reference. In this co-pending application was described a loading penalty (e.g., an n-cycle penalty, where n might be, for example, 5 cycles) for newer architectures at the FMA interface, as further described in co-pending application, U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT", and also incorporated by reference.

These two co-pending applications provided two distinctly different solutions for this FMA penalty loading problem. The first method involves unrolling loading instructions at a lower level, as fitted into higher level instructions, in order to provide a lower level preloading that begins to compensate for the n-cycle penalty, shortly establishing a steady-state preloading condition that completely compensates for the loading penalty.

The second method involves preliminarily placing the matrix data into the register block format, a nonstandard format of storing data in blocks of contiguous data that is related to the size of data blocks used by and loaded into the FMA registers and predetermined to address the loading penalty using existing available loading instructions, including, for example a crisscross loading pattern. The term "nonstandard format" in this context means that the matrix data is no longer stored in either the row major format or column major format that is conventionally used by all current computer languages. It will be noted that the register block format is used in the various exemplary embodiments of the present invention.

The concepts of the present invention provide yet a third solution to the n-cycle penalty at the FMA interface by teaching that the complex software instructions of the present invention can include the aspect of preloading into the FMA registers or, alternatively, that newer instructions available in the FMAs of SIMD machines can be used to further move the data internal to the set of FMA registers after loading by any of the loading instructions exemplarily demonstrated by the embodiments of the present invention.

Stated a bit differently, the register block format approach described in co-pending Ser. No. 10/671,888 could be a "strict SIMD solution" of the problem of the present invention, as the register block technique is modified so that the data in the register blocks are arranged in view of the unimplemented loading instructions, whereas the solution described herein, via use of low-level register instructions (e.g., splat, xxpermdi, vperm instructions) that were not that prevalent back in 2003, is a preferred solution for the problem of an unimplemented optimal loading instruction being addressed by the present invention (and, it is noted, becomes an extension of the pre-loading technique described in Ser. No. 10/671,937).

Before describing in more detail the various exemplary embodiments of the present invention, it is also noted as a preliminary matter, that the method of the present invention can be executed much more efficiently if the complex matrix data is placed into the new data structure (NDS) developed by some of the co-inventors as a method to increase efficiency on computers executing linear algebra subroutines, including matrix multiplication. Of particular interest is an NDS that these co-inventors refer to as register block format, also abbreviated in the discussion below as "ReB", which abbreviation is also used in various figures.

This particular NDS, the register block format, is discussed in detail in co-pending U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT ROUTINES".

Variations of the register block format is further described in co-pending U.S. patent application Ser. No. 11/849,272, filed on Sep. 1, 2007, to Gustavson et al., entitled "METHOD AND STRUCTURE FOR FAST IN-PLACE TRANSFORMATION OF STANDARD FULL AND PACKED MATRIX DATA FORMATS", and in U.S. patent application Ser. No. 12/033,581, filed on Feb. 19, 2008, to Gustavson et al., entitled "METHOD AND STRUCTURE FOR FAST IN-PLACE TRANSFORMATION OF STANDARD FULL AND PACKED MATRIX DATA FORMATS".

All of these co-pending applications are assigned to the present assignee, and all are incorporated herein by reference.

It is noted, however, that although this preliminary step will drastically increase the processing efficiency of the present invention, the method of the present invention stands apart from this preliminary processing step in its own novelty. However, because of the noticeable improvement in efficiency, the addition of this preliminary processing step is mentioned in exemplary preferred embodiments of the present invention.

In summary, the register block format converts matrix data from the standard format of either row-major or column-major, depending upon the computer language used, to be in contiguous data in units related to the block size used in the L0 registers. This format, therefore, places the matrix data in an order expected to be consumed during processing in chunks of data that will be loaded as a unit in the L1 and L0 caches, thereby increasing efficiency during loading as well as reducing data thrashing that typically occurs during matrix processing. As briefly mentioned above, the register block format could also be modified so that the data is arranged to overcome the effect of the unimplemented optimal loading instruction, by providing in advance the data in the formats described herein for the various embodiments rather than permuting the data after loaded into L0.

Discussion of Emulation of a Vector Times Scalar Operation for VMX Instructions

Before discussing the exemplary embodiments in detail, we will first cover the vector scalar FMA instruction $y=y+x \cdot s$. For a VMX architecture this operation requires an additional vector load scalar element $z_i$ of a vector z, where $z_i$ is any component of vector z for a VMX FMA $y=y+x \cdot z$ where vector $z=(z_i, z_i, \ldots, z_i)$, $z_i$ being the same scalar value. For complex vector scalar operations a vector load element pair instruction and/or a vector load swap element pair instruction is needed.

Figure 1B:
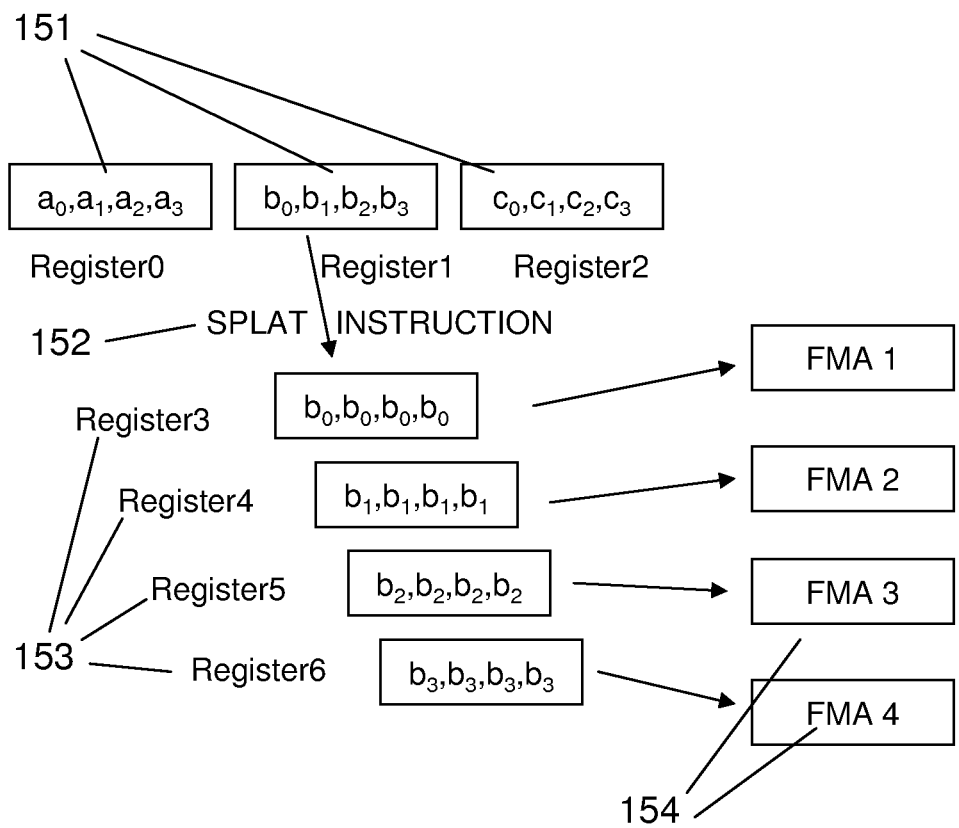
FIG. 1B exemplarily illustrates the concept of using low-level operations (e.g., splat operation) to modify data as a preliminary processing.

It is noted at this point that, for a vector FMA, the vector length $vL=2v$. Thus, a vector or VMX FMA 102 does $2v$ FMAs. It follows, therefore, that two VMX FMAs can do v complex FMAs if a VMX architecture has a number of flexible load and permute/select type vector operations. Hereinafter, we refer to a vector FMA as a VMX FMA. A VMX FMA requires a "splat" operation which, given a vector $V=(a_0, a_1, \ldots, a_{vL-1})$, produces vL vectors $V(i)=(a_i, \ldots, a_i)$ for $i=0:vL-1$, where vL is the vector length. The low-level splat operation is exemplarily demonstrated as part of FIG. 1B. The VMX FMA of the present invention does a vector scalar FMA by first using a splat operation, as will become clear from the following discussion.

We assume the vector length is vL. Typically, vL is even, so let v=vL/2. Then v is the complex vector length. In this section, from now on, we will be discussing mostly complex operations. So, as far as v goes, we will let v=2 or v=1. However, these values should be considered to be arbitrary, and the present invention is not intended as limited. Today, although v=1 or 2, in the future, v is expected to grow.

We will cover five actual instructions (1), (2), (3), (4) (5), in single precision, so v=2, that are current VMX instructions and that can be used to implement the present invention in the absence of the more expensive instructions that would normally be used for complex matrix multiplication. In case of double precision, v=1, and all five instructions can be handled by the permute double word immediate instruction, xxpermdi. The actual VMX architectures described here are currently part of IBM's VMX family of architectures.

Instruction 1 (Complex Splat Operation)

Load element pair $(a_{2i-1}, a_{2i}) \rightarrow (a_{2i-1}, a_{2i}, \ldots a_{2i-1}, a_{2i})$, or from V, we want v copies $(a_i, b_i, a_i, b_i)$ for i=0, v−1. This is a complex splat operation.

Here, we can use the VSX xxpermdi instruction. In a nutshell, VSX stands for Vector-Scalar Extension, which is an instruction set extension to the Power ISA binary floating-point architecture, extending the register file to 64 entries by 128 bits, supporting DP & SP scalar and vector operations. This means that one does not require an extra Vector Scalar Register (VSR)s for permute control vectors, as is done below. Note that v=2, and two single words constitute a double word so that we can use xxpermdi here.

\# Assume src1=$\{a_i, b_i, a_{i+1}, b_{i+1}\}$
\# Assume src2$\{a_{i+2}, b_{i+2}, a_{i+3}, b_{i+3}\}$
xxpermdi $v_1$,src$_1$,src$_{1,0}$\#$v_1$=$\{a_i, b_i, a_i, b_i\}$
xxpermdi $v_2$,src$_1$,src$_{1,3}$\#$v_2$=$\{a_{i+1}, b_{i+1}, a_{i+1}, b_{i+1}\}$
xxpermdi $v_3$,src$_2$,src$_{2,0}$\#$v_2$=$\{a_{i+2}, b_{i+2}, a_{i+2}, b_{i+2}\}$
xxpermdi $v_4$,src$_2$,src$_{2,3}$\#$v_3$=$\{a_{i+3}, b_{i+3}, a_{i+3}, b_{i+3}\}$ From the above implementation using the xxpermdi instruction, if src1 is considered as the first complex operand and src2 is considered as the second operand, then the operand components have been selectively duplicated in a specific manner to form four operands that can then be subjected to FMA processing.

Instruction 2 (Complex Splat with Component Interchange)

Load swap element pair $(a_{2i-1}, a_{2i}) \rightarrow (a_{2i}, a_{2i-1}, \ldots a_{2i}, a_{2i-1})$, or from V, we want v copies $(b_i, a_i, b_i, a_i)$ for i=0, v−1. This is a complex splat operation with interchange of the real and imaginary parts of a complex number.

For the above, one needs vperm instruction of IBM VMX architecture but here one needs only one permute control vector. The Vector Permute instruction allows any byte in two source Vector Registers to be copied to any byte in the target Vector Register. The bytes in a third source Vector Register specify from which byte in the first two source Vector Registers the corresponding target byte is to be copied. The contents of the third source Vector Register are sometimes referred to as the "permute control vector".

Assume single precision.
\# Assume src$_1$=$\{a_i, b_i, a_{i+1}, b_{i+1}\}$
\# Assume src$_2$=$\{a_{i+2}, b_{i+2}, a_{i+3}, b_{i+3}\}$
\# Assume $c_3$=0x04050607\_00010203\_04050607\_00010203
\# Assume $c_4$=0x0C0D0E0F\_08090A0B\_0C0D0E0F\_08090A0B
vperm $v_1$,src$_1$,junk,$c_3$\#$v_1$=$\{b_i,a_i,b_i,a_i\}$
vperm $v_2$,src$_1$,junk,$c_4$\#$v_2$=$\{b_{i+1},a_{i+1},b_{i+1},a_{i+1}\}$
vperm $v_3$,src$_2$,junk,$c_3$\#$v_3$=$\{b_{i+2},a_{i+2},b_{i+2},a_{i+2}\}$
vperm $v_4$,src$_2$,junk,$c_4$\#$v_4$=$\{b_{i+3},a_{i+3},b_{i+3},a_{i+3}\}$ Instruction 3 (Interchange of Components)

From V=$(a_0, b_0, a_1, b_1, \ldots, a_{v-1}, b_{v-1})$, form U=$(b_0, a_0, b_1, a_1, \ldots, b_{v-1}, a_{v-1})$. This is an interchange of the real and imaginary parts of a complex number.

For (3), one can use vperm and one permute control vector; assume single precision.
\# Assume src1=$\{a_i, b_i, a_{i+1}, b_{i+1}\}$
\# Assume src2=$\{a_{i+2}, b_{i+2}, a_{i+3}, b_{i+3}\}$
\# Assume c5=0x04050607\_00010203\_0C0D0E0F\_08090A0B
vperm v1,src1,junk,c5\#v1=$\{b_i,a_i,b_{i+1},a_{i+1}\}$
vperm v2,src2,junk,c5\#v2=$\{b_{i+2},a_{i+2},b_{i+3},a_{i+3}\}$ Instruction 4 (Complex Duplication)

Given V=$(a_0, b_0, a_1, b_1, \ldots, a_{v-1}, b_{v-1})$ where vL=2v. V holds v pairs of elements. We want to form V1=$(a_0, a_0, a_1, a_1, \ldots, a_{v-1}, a_{v-1})$ and V2=$(b_0, b_0, b_1, b_1, \ldots, b_{v-1}, b_{v-1})$ from V. This is a complex duplicate real, imaginary part operation. Assume single precision, v=2 so vL=4.

\# Assume src1=$\{a_i, b_i, a_{i+1}, b_{i+1}\}$
\# Assume src2=$\{a_{i+2}, b_{i+2}, a_{i+3}, b_{i+3}\}$
\# Assume c1=0x00010203\_00010203\_08090A0B\_08090A0B
\# Assume c2=0x04050607\_04050607\_0C0D0E0F\_0C0D0E0F
vperm v1,src1,src2,c1\#v1=$\{a_i,a_i,a_{i+1},a_{i+1}\}$
vperm v2,src1,src2,c2\#v2=$\{b_i,b_i,b_{i+1},b_{i+1}\}$ To expand on the definition of vperm, byte j in the permute control vector identifies the byte from the source vector to be placed in byte j of the target vector, where the source vector is the concatenation of two vectors (i.e., total of 32 bytes).

There are other less efficient approaches, requiring longer instruction pathlength and/or more registers for solving problems (1-4) above.

We note that VMX defined a number of instructions that were essentially special cases of vperm (e.g., pack & unpack, merge). The cases listed here would be trivial to include in a possible ISA extension for VSX architecture that would both avoid the need to use any VSRs for holding permute control vectors and avoid the VSRs 32-63 restriction of vperm at the cost of additional instructions having to be allocated and decoded.

Instruction 5 (Vector Splat)

Given V=$(x_0, x_1, \ldots, x_{vL-1})$. V holds vL elements. We want to form V(i)=$(x_i, x_i, \ldots, x_i)$ for i=0: vL−1 from V. This is a vector splat operation. For (5), one can use vperm and vL permute control vector; assume single precision.
\# Assume src1=$\{x_0,x_1,x_2,x_3\}$
\# Assume c1=0x00010203\_00010203\_00010203\_00010203
\# Assume c1=0x04050607\_04050607\_04050607\_04050607
\# Assume c2=0x08090A0B\_08090A0B\_08080A0B\_08090A0B
\# Assume c3=0x0C0D0E0F\_0C0D0E0F\_0C0D0E0F\_0C0D0E0F
vperm v(0),src1,junk,c0\#v(0)=$\{x_0, x_0, x_0, x_0\}$
vperm v(1),src1,junk,c1\#v(1)=$\{x_1, x_1, x_1, x_1\}$
vperm v(2),src1,junk,c2\#v(2)=$\{x_2, x_2, x_2, x_2\}$
vperm v(3),src1,junk,c3\#v(3)=$\{x_3, x_3, x_3, x_3\}$ On some common VMX architectures, these instructions are called "vector load splat", see (5) above, of variants of "vector load permute or vector select." An illustration of splat is given in FIG. 1B.

In the next part of the discussion, we now list some actual additional instructions for future reference based on sub problems, called "Problems" in the following discussion, that will arise in the third embodiment to be described later. First, we list the Problems and solutions for arbitrary vL and then we give the actual solutions using actual instructions of some VMX architectures:

Third Embodiment Sub-Problems and Their Solution

Assume we have complex matrices A, B, and C. Each a(i,j) is a (a,b), b(i,j) is a (c,d) and c(i,j) is a (e,f). Matrices A and C are in column major format and B is in row major format. This means that transpose matrix $B^T$ is in column major format. A is mb by kb, B is nb by kb and C is mb by nb. The computation is ZGEMM: C+=A*B' where prime is transpose. As in all embodiments except for real_GEMM, let vL be the vector length, v=vL/2, m1*v=mb, n1*v=nb.

Problem 1.

We need to form a real matrix Br whose (i,j) elements are c+d. A row of Br consists of n1/2 vectors. To get it, we need n1 vectors of B. Let us consider two vectors of B holding vL pairs (c,d). We need one vector of vL (c+d)'s. This is a contraction operation with a simple add. Let vL=4. Two vector loads gives $(c_0,d_0,c_1,d_1)$ and $(c_2,d_2,c_3,d_3)$. Then two selects gives $(c_0,c_1,c_2,c_3)$ and $(d_0,d_1,d_2,d_3)$ and one add gives the result $(c_0+d_0,c_1+d_1,c_2+d_2,c_3+d_3)$. This solution takes five vector ops. The actual solution, given below, takes six vector operations when vL=4 and five vector operations when vL=2.

Problem 1—Instruction 6.
VSX (2-way SIMD DP)
1xvd2ux $v_0$,B(i,j) #$v_0$=B(i,j)=$(c_0,d_0)$
1xvd2ux $v_1$,B(i+1,j) #$v_1$=B(i+1,j)=$(c_1,d_1)$
xxpermdi $v_2,v_0,v_1$,0b00 #$v_2$=$(c_0,c_1)$
xxpermdi $v_3,v_0,v_1$,0b11 #$v_3$=$(d_0,d_1)$
xvadddp $v_4,v_2,v_3$ #$v_4$=$(c_0+d_0,c_1+d_1)$
stxvd2ux $v_4$,Br(i:i+1,j)#Br(i:i+1,j)=$(c_0+d_0,c_1+d_1)$
VSX2 (4-way SIMD DP)
1x2vd4ux $v_0$,B(i:i+1,j) #$v_0$=B(i:i+1,j)=$(c_0,d_0,c_1,d_1)$
1x2vd4ux $v_1$,B(i+2:i+3,j) #$v_1$=B(i+2:i+3,j)=$(c_2,d_2,c_3,d_3)$
x2xpermdi $v_2,v_0,v_1$,0b00 #$v_2$=$(c_0,c_2,c_1,c_3)$
x2xpermdi $v_3,v_0,v_1$,0b11 #$v_3$=$(d_0,d_2,d_1,d_3)$
x2vadddp $v_4,v_2,v_3$#$v_4$=$(c_0+d_0,c_2+d_2,c_1+d_1,c_3+d_3)$
x2xpermqi $v_5,v_4$,0b00_10_01_11 #$v_5$=$(c_0+d_0, c_1+d_1,c_2+d_2, c_3+d_3)$
stx2vd2ux $v_6$,Br(i:i+3,j) #Br(i:i+3,j)=$(c_0+d_0,c_1+d_1,c_2+d_2, c_3+d_3)$ Problem 2.

We need to form a real matrix Ai whose (i,j) elements are the b's of (a,b)'s. A column of Ai's consists of m1/2 vectors. To get it we need m1 vectors of A. We consider two vectors of A holding vL pairs (a,b)'s. We need one vector of vL b's. This is a contraction operation.

Let vL=4 again. Two vL's gives $(a_0,b_0,a_1,b_1)$ and $(a_2,b_2,a_3,b_3)$. A single select vector operation or vector permute operation is needed to produce $(b_0,b_1,b_2,b_3)$. This solution then needs three vector operations. The actual solution, given below takes four vector operations when vL=4 and three vector operations when vL=2.

Problem 2—Instruction 7.
VSX (2-way SIMD DP)
1xvd2ux $v_0$,A(i,j) #$v_0$=A(i,j)=$(a_0,b_0)$
1xvd2ux $v_1$,A(i+1,j) #$v_1$=A(i+1,j)=$(a_1,b_1)$
xxpermdi $v_2,v_0,v_1$,0b11 #$v_2$=$(b_0,b_1)$
stxvd2ux $v_2$,Ai(i:i+1,j)#Ai(i:i+1,j)=$(b_0,b_1)$ VSX2 (4-way SIMD DP) (assume xxpermdi2 operates like a parallel pair of xxpermdi ops, whereas xxpermqi2 operates across octword)
1x2vd2ux $v_0$,A(i:i+1,j) #$v_0$=A(i:i+1,j)=$(a_0,b_0,a_1,b_1)$
1x2vd2ux $v_1$,A(i+2:i+3,j)#$v_1$=A(i+2:i+3,j)=$(a_2,b_2,a_3,b_3)$
x2xpermdi $v_2,v_0,v_1$,0b11 #$v_2$=$(b_0,b_2,b_1,b_3)$
x2xpermqi $v_3,v_2$,0b00_10_01_11 #$v_3$=$(b_0,b_1, b_2,b_3)$
stx2vd2ux $v_3$,Ai(i:i+3,j) #Ai(i:i+3,j)=$(b_0,b_1,b_2,b_3)$ Problem 3.

Consider a column of matrix A consisting of m1 vectors $(a_0,b_0, \ldots, a_{v-1},b_{v-1})$. Take just one vector $(a_0,b_0, \ldots, a_{v-1}, b_{v-1})$ and assume vL=4 so v=2. Then one vector of the m1 vectors is $(a_0,b_0,a_1,b_1)$. One needs to form the vector $(a_0+b_0, a_0-b_0,a_1+b_1,a_1-b_1)$. We give a four vector operation solution:
1 vector load of $(a_0,b_0,a_1,b_1)$
1 vector select to gets V1=$(a_0,a_0,a_1,a_1)$
1 vector select to gets V2=$(b_0,b_0,b_1,b_1)$
1 vector FMA gives the result: V1=V1+V2*V3, where V3=(one, −one, one, one). The actual solutions given below require four vector ops for vL=4 and 2.

Problem 3—Instruction 8.
VSX (2-way SIMD DP)
$v_3$=(+1.0,−1.0)
1xvd2ux $v_0$,A(i,j) #$v_0$=A(i,j)=$(a_0,b_0)$
xxpermdi $v_1,v_0,v_0$,0b00#$v_1$=$(a_0,a_0)$
xxpermdi $v_2,v_0,v_0$,0b11 #$v_2$=$(b_0,b_0)$
xvmaddadp $v_1,v_2,v_3$ #$v_4$=$(a_0+b_0,a_0−b_0)$
stxvd2ux $v_1$,Z(i:i+1,j) #Z(i:i+1,j)=$(a_0+b_0,a_0−b_0)$
VSX2 (4-way SIMD DP)
$v_3$=(+1.0,−1.0,+1.0,−1.0)
1x2vd2ux $v_0$,A(i:i+1,j) #$v_0$=A(i:i+1j)=$(a_0,b_0,a_1,b_1)$
x2xpermqi $v_1,v_0$,0b00_00_10_10 #$v_1$=$(a_0,a_0,a_1,a_1)$
x2xpermqi $v_2,v_0$,0b01_01_11_11 #$v_2$=$(b_0,b_0,b_1,b_1)$
x2vmaddadp $v_1,v_2,v_3$ #$v_1$=$(a_0+b_0,a_0−b_0,a_1+b_1,a_1−b_1)$
stx2vd2ux $v_3$,Z(i:i+3,j) #Z(i:i+3,j)=$(a_0+b_0,a_0−b_0,a_1+b_1, a_1−b_1)$ Problem 4.

We first give some preliminary information. We need to form real matrices Ai and Br for doing the DGEMM computation Tr=$A_i$*Br^T. Tr consists of mb*nb real elements:
tr(i,j)=sum over k of $b_{ik}$*$(c+d)_{kj}$, where $b_{ik}$=$Ai_{ij}$ and $(c+d)_{kj}$=$Br^T_{kj}$ (In embodiment DGEMM we give a VMX DGEMM kernel embodiment.)

From tr(i,j), we need to form two elements (−tr(i,j), tr(i,j)) which is Problem 4, and it is an expansion operation. Again let vL=4. Do a load of a column of tr. It consists of m1/2 vector loads. Just take one such load. One vL gives $(t_0,t_1,t_2,t_3)$. We want to form two vectors $(t_0,t_0,t_1,t_1)$ and $(t_2,t_2,t_3,t_3)$. This takes three vector operations consisting of one vector load operation and two vector selects or permutation operations. The actual solution given below requires three vector operations for vL=4 and vL=2. Note: Here we will need to get a (−,+,−,+) pattern in a vector register for use later on. This will be done by a VMX FMA with V4=(−one, one, −one, one).

In what follows below, we refer to IBM's VSX architecture and a theoretical architecture extension of VSX referred to as VSX2 described herein for purpose of demonstrating yet another possible embodiment with wider registers. For VSX assume:

VSX VSRs are 128 bits (i.e., 2-way DP) [note: "DP" means double precision]
1xvd2ux loads 16 bytes into the target VSR (word-aligned accesses)
xxpermdi concatenation of a doubleword selected from VSR[VRA] and a doubleword selected from VSR [VRB] placed in VSR[VRT]

xvadddp performs two parallel DP add operations
xvmaddadp performs four parallel DP multiply-accumulate operations
stxvd2ux stores 16-byte source VSR to memory (word-aligned accesses)

For VSX2 assume:
VSX VSRs are widened to 256 bits (i.e., 4-way DP)
1x2vd4ux loads 32 bytes into the target VSR (unknown how much misalignment can be supported by implementation)
x2xpermdi performs same function as a pair of parallel VSX xxpermdi ops (i.e., no inter-quadword routing)
  concatenation of a doubleword selected from quadword 0 of VSR[VRA] and a doubleword selected from quadword 0 of VSR[VRB] placed in quadword 0 of VSR[VRT]
  concatenation of a doubleword selected from quadword 1 of VSR[VRA] and a doubleword selected from quadword 1 of VSR[VRB] placed in quadword 1 of VSR[VRT]
x2xpermqi performs an octword-to-octword doubleword-wise permute (i.e., for each target doubleword, selects any doubleword from the source octword)
x2vadddp performs four parallel DP add operations.
x2vmaddadp performs four parallel DP multiply-accumulate operations.
stx2vd4ux stores 32-byte source VSR to memory (unknown how much misalignment can be supported by implementation).

Problem 4. Instruction 9
  VSX (2-way SIMD DP)
  1xvd2ux $v_{01}$,tr(i:i+1,j) # $v_{01}=(t_0,t_1)$
  xxpermdi $v_{02},v_{01},v_{01}$,0b00# $v_{02}=(t_0,t_0)$
  xxpermdi $v_{03},v_{01},v_{01}$,0b11# $v_{03}=(t_1,t_1)$
  VSX2 (4-way SIMD DP)
  1x2vd4ux $v_{01}$,tr(i:i+3,j) #$v_{01}=(t_0,t_1,t_2,t_3)$
  x2xpermqi $v_{02},v_{01}$,0b00__00__01__01 #$v_{02}=(t_0,t_0,t_1,t_1)$
  x2xpermqi $v_{03},v_{01}$,0b10__10__11__11 #$v_{03}=(t_2,t_2,t_3,t_3)$ Preliminary Material on the Eight Exemplary Embodiments Since arithmetic processing units doing an FMA can execute only real arithmetic, a "complex FMA", meaning an FMA capable of executing the complex processing of a ZGEMM operation c(i, j)=c(i, j)+a(i,k)·b(k,j), is actually made of four real FMAs, since this operation is equivalent to:

$$\begin{pmatrix} cR(i,j) \\ cI(i,j) \end{pmatrix} += \begin{pmatrix} aR(i,k) \\ aI(i,k) \end{pmatrix} \cdot \begin{pmatrix} bR(k,j) \\ bI(k,j) \end{pmatrix},$$

which is equivalent to:
  cR(i,j)+=aR(i,j)·bR(i,j)−aI(i, j)·bI(i,j) and cI(i,j)+=aI(i,j)·bR(i,j)+aI(i, j)·bI(i,j).

The problem being addressed by the present invention is to provide an efficient mechanism to perform the complex ZGEMM operation above when there are neither vector scalar FMA instructions nor cross negation load instructions.

As explained, the complex operation shown above consists of four multiply operations and four add operations and would require four FMAs. Let $$\begin{pmatrix} e \\ f \end{pmatrix}, \begin{pmatrix} a \\ b \end{pmatrix}, \begin{pmatrix} c \\ d \end{pmatrix}$$

represent three complex numbers, where $$c_{ij} = \begin{pmatrix} e \\ f \end{pmatrix}$$

is an element of the C matrix;

$$a_{ik} = \begin{pmatrix} a \\ b \end{pmatrix}$$

is an element of the A matrix; and $$b_{kj} = \begin{pmatrix} c \\ d \end{pmatrix}$$

is an element of the B matrix.

We want to use a VMX FMAs to do complex arithmetic. Just consider two components of a VMX vector of length vL=2v, where vL at the present time is typically 2, 4, so that v=1, 2. Let VRA represent a vector register holding part of a column of matrix A, VRB represent a vector register holding part of a row of matrix B, and VRC represent a vector register holding part of a column of matrix C. Let $a_{ik}$ be part of VRA, $b_{kj}$ be part of VRB, and $c_{ij}$ be part of VRC and be in the same relative positions of VRA, VRB, and VRC.

Accordingly, part of a complex FMA can be formed in VMX FMA: VRC=VRC+VRA·VRB, as formed by vL ordinary FMAs. This is equivalent to doing v dual FMAs. It is noted that it is common in the art to simultaneously initiate two VMX FMAs every cycle, so that it is no problem to provide the complex FMA described above, as long as they are independent.

We now consider a dual FMA of a VMX FMA. The first FMA of the dual FMA is called the even FMA and the second FMA of the dual FMA is called the odd FMA. We label these "e", for "even" and "o" for "odd".

Thus, $c_e = c_e + a_e * b_e$ or $c_e += a_e * b_e$ $c_o = c_o + a_o * b_o$ or $c_o += a_o * b_o$ It should be clear that these dual FMAs are independent and can be done in parallel. In fact, a VMX FMA does v of the dual FMAs in parallel.

Now, VRA partly holds $$\begin{pmatrix} a \\ b \end{pmatrix},$$

VRB partly holds $$\begin{pmatrix} c \\ d \end{pmatrix},$$

and VRC partly holds $$\begin{pmatrix} e \\ f \end{pmatrix}.$$

The related dual FMA does $$\begin{pmatrix} e = e + ac \\ f = f + bd \end{pmatrix},$$

but a complex FMA actually requires $$\begin{pmatrix} e = e + ac - bd \\ f = f + ad + bc \end{pmatrix}.$$

Note that the related dual FMA computes the wrong thing but is partially right in the following sense: two products (e.g., ac and bd) of the four products (e.g., ac, bd, ad, and bc) have been computed. Also note that this dual FMA does not compute ad and bc. The embodiments of the present invention demonstrate several ways to overcome this problem.

For all eight embodiments we will prepare the matrices A, B, C to consist of ReBs, as previously discussed, for processing efficiency.

Method 1:

One needs double the number of matrix real elements because each complex matrix element consists of two real numbers. We do four real multiplies and four real adds in doing one complex multiply, which is four FMAs. Doing one dual FMA only gets two real FMAs, which is only half of the answer we will need. To get the other half, we can form another copy of VRB (e.g., VRB1) to hold $$\begin{pmatrix} d \\ c \end{pmatrix}$$

and another copy of VRC (e.g., VRC1). Initially, place $$\begin{pmatrix} 0 \\ 0 \end{pmatrix}$$

in the both VRC and VRC1 and currently let $$\begin{pmatrix} e \\ f \end{pmatrix}$$

be in VRC and $$\begin{pmatrix} g \\ h \end{pmatrix}$$

be in VRC1. For VRA we just keep the original copy of $$\begin{pmatrix} a \\ b \end{pmatrix}$$

in it. Now, do two dual FMAs as part of 4v FMAs:

VRC=VRC+VRA·VRB and VRC1=BRC1+VRA·VRB1.

One gets e=e+ac and f=f+bd for the first dual FMA and g=g+ad and h=h+bc for the second dual FMA. Now, VRC will be computing two sums which hold the real part of the complex FMA and VRC1 will be computing two sums which hold the imaginary part of the complex FMA. In actual practice, this sum will have of the order of a hundred (e.g., kb=100), or so, summands. When each of the two sums of kb terms are complete, we will get the correct answer from the sum of the four products $$\begin{pmatrix} e \\ f \end{pmatrix} \text{ and } \begin{pmatrix} g \\ h \end{pmatrix}$$

in VRC and VRC1. Call this way of forming the four products way "Method 1.

We use three other ways to get the sums of these four products in (e, f) and (g, h).

Method 2:

place (b, a) in VRA1 and form VRC=VRC+VRA·VRB and VRC1=VRC1+VRA1·VRB getting in VRC the same values as way (1) and in VRC1 getting g=g+bc and h=h+ad.

Method 3:

place (c, c) in VRB and (d,d) in VRB1 and form VRC=VRC+VRA·VRB and VRC1=VRC1+VRA·VRB1 getting in VRC (e+ac, f+bc) and in VRC1 getting (g+ad, h+bd).

Method 4:

place (a,a) in VRA and (b,b) in VRA1 and form VRC=VRC+VRA·VRB and VRC1=VRC1+VRA1·VRB getting in VRC (e+ac, f+ad) and in VRC1 getting (g+bc, h+bd).

Ways (1) and (2) will be used in the first embodiment and ways (3) and (4) will be used in the second embodiment. Thus, we will now have two ways each to do each of our first two embodiments.

Figure 2:
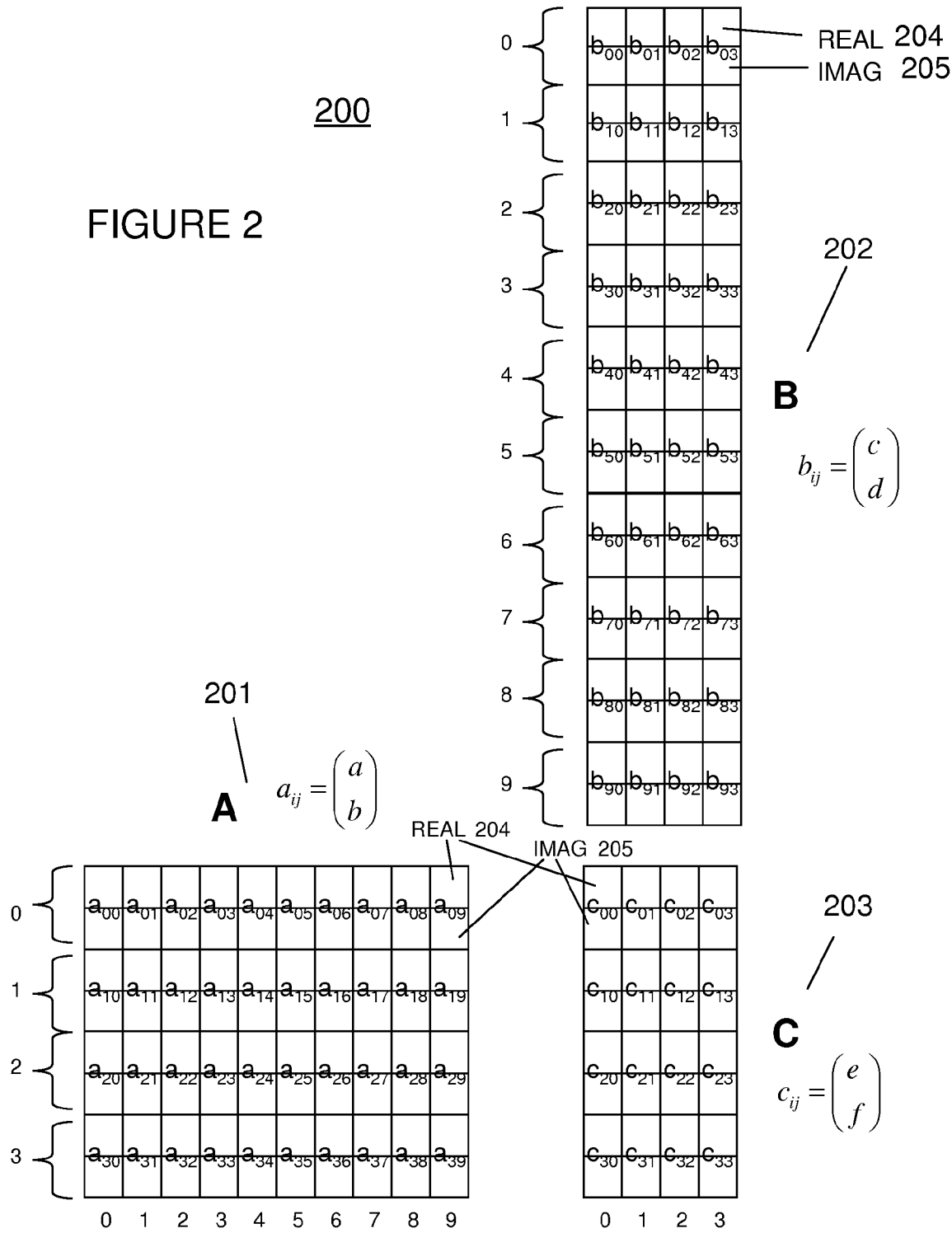
FIG. 2 illustrates an example of matrix data 200 as using complex matrix elements, each element $a_{ij}$ having a real component 204 and imaginary component 205.

For purposes of explaining the exemplary embodiments of matrix multiplication of the present invention, FIG. 2 shows exemplarily matrix data 200 for matrices A, B, and C, 201, 202, 203, each having complex elements, for explaining the execution of the ZGEMM operation C=C+A·B. It is noted that the expression C=C+A·B is sometimes abbreviated C+=A·B and the expression C=C−A·B is sometimes abbreviated C−=A·B.

Therefore, for example, element $a_{00}$ is indicated as having real component 204 in the upper data position for element $a_{00}$ and imaginary component 205 in the lower data position for element $a_{00}$. Similarly, all matrix elements in FIG. 2 have data slots for real and imaginary components, demonstrating that the number of data slots for complex matrices will be double the number of elements for a real matrix.

Matrices A, B, and C are presumed to comprise complex data, so that each matrix element (e.g., $a_{00}$) includes a real component and an imaginary component, and FIG. 2 shows an example in which M=40=m·mb, N=20=n·nb, and K=60=k·kb, so that mb=4, nb=4, and kb=10, and $A_{ReB}$ has size 4 by 10 and holds 40 complex elements, $B_{ReB}$ has size 10 by 4 and holds 40 complex elements, and $C_{ReB}$ has size 4 by 4 an holds 16 complex elements. In this example, matrix A is assumed to have LDA=40 with size 40 by 60, matrix B is assumed to have LDB=60 with size 60 by 20, and matrix C is assumed to have LDC=40 with size 40 by 20, where the immediate operands $A_{ReB}$, $B_{ReB}$, and $C_{ReB}$ are submatrices of matrices A, B, and C, respectively, as preliminarily placed in the register block format described in the first of the above co-pending applications, in order to expedite retrieval. It is noted that the above values for M, N, K, m, n, k, mb, nb, kb are not necessarily typical. However, they are chosen in enough generality to make the invention description clear.

In FIG. 2, matrix $A_{ReB}$ is 4×10, matrix $B_{ReB}$ is 10×4, and product matrix $C_{ReB}$ is 4×4. However, generally speaking, one should make kb larger to save needless loadings and storings of C. Hence, we would have k=1 so that kb would be 60.

Let VRA and VRB hold v complex numbers: VRA=($a_0$, $b_0$, ..., $a_{v-1}$, $b_{v-1}$) and VRB=($c_i$, $d_i$, ..., $c_i$, $d_i$), i=0:v−1. Let (a,b) and (c,d) be a generic pair for VRA and VRB. We are interested in forming four products ac, ad, bc, bd. We will accumulate sums of these four products in VRC and VRC1 in the same relative position of (a,b) in VRA. (a,b) comes from a column of $A_{ReB}$ and (c,d) comes from the same row of $B_{ReB}$. There are mb*nb such pairs and we are required to form four products with update for each of them or 4*mb*nb products with updated in all.

To get an arbitrary pair, we will need to form nb vectors ($c_i$, $d_i$, ..., $c_i$, $d_i$) for VRB and nb vectors ($d_i$, $c_i$, ..., $d_i$, $c_i$) for VRB1, i=0: nb−1. Let nb=n1*v. This only requires nb VRB's and nb VRB1's as each VRB and VRB1 can be used m1 times on m1 VRA vectors where we let mb=m1*v. The m1 VRA vectors will hold a column of $A_{ReB}$. One needs m1*nb VRC's and m1*nb VRC1's to hold the four generic products ac, ad, bc, bd for 2*mb*nb real elements of $C_{ReB}$. Each VRC and VRC1 holds v complex elements so the total number of product terms is 2*2*v*m1*nb or 4*mb*nb real product terms.

We have just seen one way to do this, by using VRA twice with VRB and VRB1 to form (ac, bd)'s in VRC's and (ad, bc)'s in VRC1's. Recall this was way (1). Now we pursue way (2). We use VRA1 to hold ($b_0$, $a_0$, ..., $b_{v-1}$, $a_{v-1}$) instead of VRB1 to form the same four generic pairs (ac, bd) in VRC and (bc, ad) in VRC1.

In way (1), there are m1+2*nb "VMX loads", some of these loads from storage and some from within the register file of the VMX unit. For these latter VMX loads, we refer back to instructions (1-4) detailed earlier. In way (2), there are 2*m1+nb "VMX loads". Again, some of these loads from storage and some from within the register file of the VMX unit. For these latter VMX loads, we refer back to instructions (1-4) detailed earlier.

Now we consider the other two ways (3) and (4), which make up embodiment two. From generic (a,b) and (c,d), we can get four products from (a,a)×(c,d) and (b,b)×(c,d). This is way (4). Form four products from (a,b)×(c,c) and (a,b)×(d,d); we get way (3). Way (3) requires 2*m1 VRA registers and nb VRB registers and way (4) requires m1 VRA registers and 2*nb VRB registers. These two counts are the same as ways (2) and (1).

Ways (2) and (1) give us embodiment one and ways (4) and (3) give us embodiment two.

Let VR hold v complex numbers ($x_0$, $y_0$, ..., $x_{v-1}$, $y_{v-1}$). Since, $A_{ReB}$, $B_{ReB}$ and $C_{ReB}$ are laid out optimally this VR load can be done by any VMX architecture from storage. From VR we need UR=($y_0$, $x_0$, ..., $y_{v-1}$, $x_{v-1}$). If the VMX unit has such a "load" from within the VMX unit itself we can use it. If not, during the register block formation of VR we will make a copy of UR in the register block. This will double the size of the $A_{ReB}$ or the $B_{ReB}$ register block depending on whether VR holds data from A or $B_{ReB}$. If VR holds $B_{ReB}$ data, then we require v copies of VR in the form $WR_i$=($x_i$, $y_i$, ..., $x_i$, $y_i$), i=0:v−1. If such a VMX instruction does not exist we will need to increase $B_{ReB}$ by a factor of nb or 2nb. Note that, if 2nb, then $A_{ReB}$ does not need to be doubled. In the 2nb case, we need to additionally form $XR_i$=($y_i$, $x_i$, ..., $y_i$, $x_i$), i=0:v−1.

Here is an aside, which for the most part is perhaps a bit beyond the scope of this patent. Data for ZGEMM resides in $A_{ReB}$ and $B_{ReB}$ and these arrays are often in L2 cache or L1 cache. Even with optimal register blocking, $A_{ReB}$ and $B_{ReB}$ are not loaded in a single cycle into the VMX unit. Here, the important thing to do is to "overlap computation with communication". This overlap can be accomplished by very careful scheduling of VMX A and B ReB loads as the VMX FMA's are taking place. To be able to do this, extra VRA registers and VRB registers are required to hold the prefetched $A_{ReB}$ and $B_{ReB}$ operands.

Hence, m1+2nb or 2m1+nb VRA's and VRB's may need to be increased if one wants to overlap communication with computation.

To get peak performance one needs
2m1nb≧min(2m1_nb, m1+2nb)+n1
This inequality says that the total number of VMX loads is less than or equal to the total of VMX FMAs. Note that this inequality gets modified when we use "VMX loads" from within the VMX unit itself; see instructions (1-4) given earlier. These loads (1-4) take multiple cycles but they are preferable to the m1+n1 loads from L2 and L1 which can take many cycles even with prefetching. In principle, by making the register block size large enough, the quadratic nature of the VMX FMA's will make the above inequality true as the loading of the A and B operands of ZGEMM is linear. Of course, the sum of the VRA registers, VRB registers, and VRC registers needed must be less than size of the VMX register file. This means that mb and nb cannot be too large relative to the size VL times the size of the VMX register file.

Details of the First Embodiment

Figure 3:
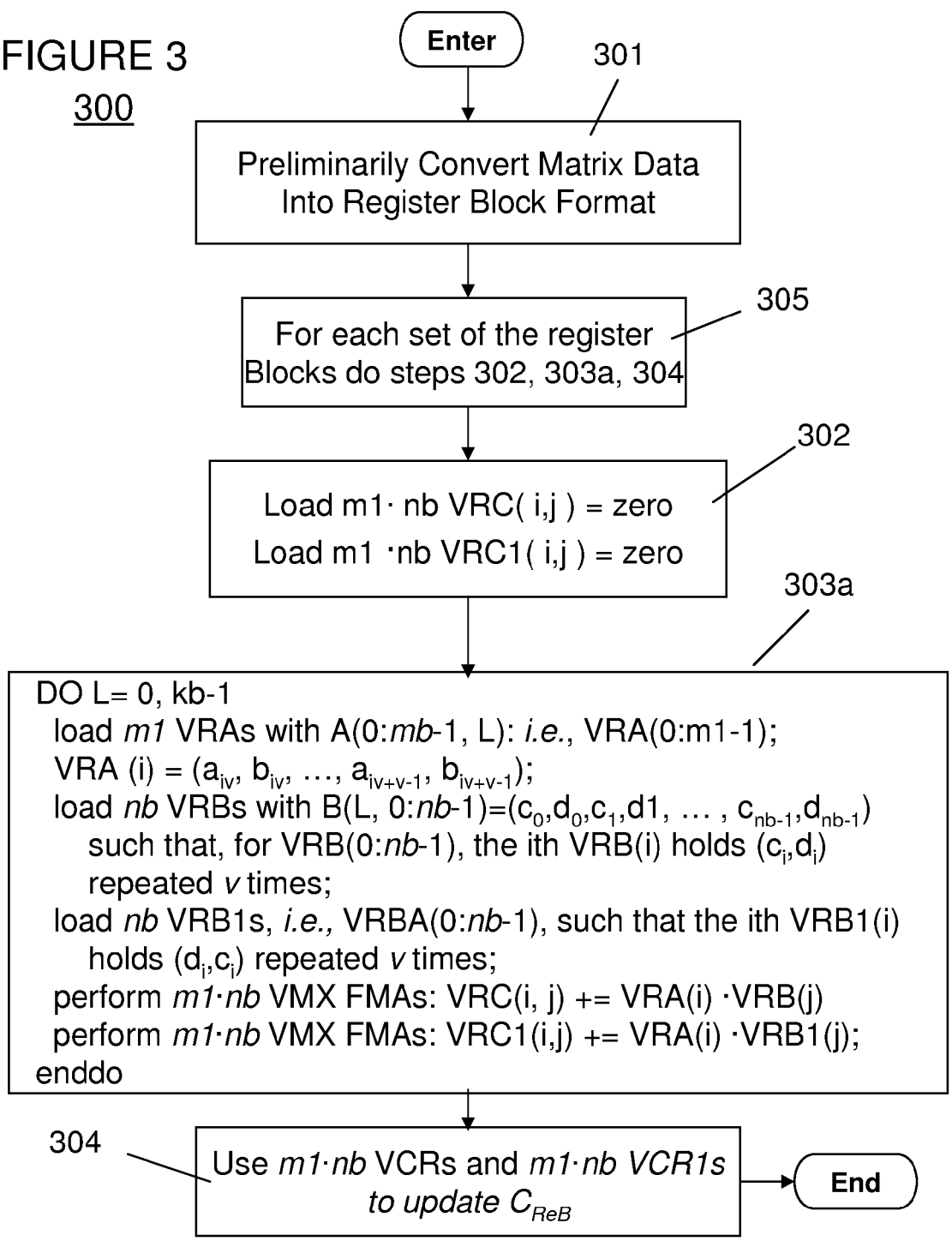

As a summary of the present invention, FIG. 3 shows exemplarily a flowchart 300 of the method of a first exemplary embodiment of the present invention, given matrix operands A, B, C.

There are two cases to be discussed hereinafter. The first case involving strict VMX, along with the second case involving non-strict VMX, are mentioned together. The non-strict VMX case uses the VMX load type instructions (1-4) described earlier.

In ways (1) and (2) duplicate dual FMAs are set up, typically as at least two pipelines being simultaneously fired and synchronized. Each dual FMA comprises a conventional FMA that executes the operation c=c+ab, where a, b, c are real scalars. The term duplicate dual FMAs means that there are two FMAs needed to form half of a complex FMA, so that one dual FMA handles the computations of the real component and the other dual FMA handles the computations of the imaginary component.

The first dual FMA is done by executing VRC=VRC+VRA·VRB, and the second dual FMA is done by executing VRC1=VRC1+VRA1·VRB1. Actually, these two VMX FMAs perform v complex FMA's. It is noted that, if a VMX architecture had a vector*scalar operation, you would not need to duplicate data for either the A or B operand. In terms of VMX language this is called "splatting" and currently splatting is necessary.

Now we refer to FIG. 3. In step 301, the matrix data is preliminarily converted into the register block format, as briefly described above.

Thus, in step 301, the operands for demonstrating the method of the present invention become: Six ReB's of 4 by 10 submatrices, $A_{ReB}$, concatenated on their column dimension form one four by 60 ReB of A. Six ReB's of 10 by 4 submatrices, $B_{ReB}$, concatenated on their row dimension form one 60 by 4 ReB of B. C is a 10 by 5 matrix whose elements are 4 by 4 submatrices, or one $C_{ReB}$. This is already shown exemplarily in FIG. 2. In FIG. 2, the ReB's of A and B are shown as being 4 by 10 and 10 by 4 respectively. Steps 302, 303a or b and 304 are done for each of the m*n*k 10*5*6=300 register blocks. As previously mentioned k should be 1 and then kb=60 and so there are just 50 register block sets which are the number of ReB's in C.

In step 302, a register block of size (0:mb−1, 0:nb−1) is filled with zeros in VRC and VRC1. m1nb VRC's and m1nb VRC1's are required. Each C VR holds v complex numbers so 2m1nb C VR's hold 2mb*nb real numbers or mb*nb complex numbers.

Box 303 consists of executing kb identical steps: L=0:kb−1. We choose way (2) or box 303b for our detailed description. This requires m1 VRA registers and m1 VRA1 registers and nb+n1 VRB registers. We note that loading m1 VRA registers is supported by all VMX architectures. The loading of m1 VRA1 registers may be able to be done from the data now in the m1 VRA registers. Recall back to how each VRA1 is formed from each VRA. We only cover this case here as the strict VMX case is handled by m1 VMX additional loads from the $A_{ReB}$ register file. The loading from VRA is to be preferred.

To get VRA1 from VRA refer back to load (3). Next we need to load nb VRB registers with v copies of each complex ($c_i$, $d_i$) obtained from row L of $B_{ReB}$. The preferred way would be to load these nb VRB vectors from the n1 VR's loaded with $B_{ReB}$(L,0:nb−1). Each of these n1 VRB registers contains v complex elements of $B_{ReB}$(L,0:nb−1). The i-th one, where i=0:n1−1 holds $B_{ReB}$ (L,iv:iv+v−1); i.e., VRB(i) holds a ($c_0$, $d_0$, $c_{v-1}$, $d_{v-1}$). From VRB(i) we form v VRB registers each consisting of VRB(j, i)=($c_i$, $d_i$, ..., $c_i$, $d_i$). For the VMX instruction needed here refer back to instruction (1).

The non-preferred way is to enlarge $B_{ReB}$ by a factor of v so that the data in VRB(j,i) gets stored in memory during preprocessing step 301. At this point the data for outer product step L is in m1 VRA registers and m1 VRA1 registers and nb VRB registers. So, we perform m1nb VMX FMAs VRC(i,j)+=VRA(i)*VRB(j) and m1nb VMX FMAs VRC1(i,j)+=VRA1(i)*VRB(j) where i=0:m1−1 and j=0:nb−1. This completes the description of box 303b.

When box 303b is complete the VRC registers and VRC1 registers contain $A_{ReB}*B_{ReB}$ as mb*nb product terms each consisting of accumulated sums of four product terms (ac, bd) and (bc, ad). Box 304 assembles each of these accumulated terms to be (ac−bd, bc+ad) and then adds them to $C_{ReB}$.

Description of Box 304

A single VMX register VM11 where VM11 stands for V−11 is reserved to hold VM11=(−one, one, ..., −one, one). Thus, the purpose of VM11 is to change the sign of the accumulated bd terms. Box 304 consist of performing m1*nb VMX operations over $C_{ReB}$.

Hence, it suffices to describe the single operation over VRC(i,j) for j=0:nb−1 and i=0:m1−1. A vector select or perm operation in Box 304 is used to form vector U=($bd_0$, $bc_0$, ..., $bd_{v-1}$, $bc_{v-1}$). We have v pairs of (ac, bd) in VRC(i,j) and v pairs of (bc, ad) in VRC1(i,j). We want v pairs of (ac,ad) in VRC1 and v pairs of (bc,bd) in auxiliary vector U. To do this we use VRC(i,j) and VRC1(i,j) and U to move the bd terms of VRC(i,j) and the bc terms of VRC1(i,j) to be v pairs of (bd,bc) in U. We can use load (3) with src1=VRC(i,j) and src2=VRC1(i,j) and c5=0x04050607_10111213_0C0D0E0F_18191A1B to get U.

Next, we use VRC(i,j) and VRC1(i,j) and another vector select or perm operation to form v pairs of (ac,ad) in VRC1 (i,j). We can use load (3) with src1=VRC(i,j) and src2=VRC1 (i,j) and another c5=0x00010203_14151617_08090A0B_1C1D1E1FB to get modified VRC1(i,j). We do these two select or perm operations to line up the real part accumulated products ac and bd in even VR locations and the imaginary part accumulated products ad and bc in odd VR locations of VRC1(i,j) and U. Now a single VMX FMA VRC1(i,j)+=U*VM11 produces v accumulated pairs (ac−bd, ad+bc) of correct results. So, VRC1(i,j) holds v pairs correct product results of $A_{ReB}*B_{ReB}$.

All that remains is to update VRC1(i,j) with corresponding v pairs (e, f) of $C_{ReB}$. This can be done by loading VRC(i,j) with corresponding v pairs (e, f) of $C_{ReB}$. Note that VRC(i,j) contents can now be destroyed as the desired result of v pairs of (ac−bd, ad+bc) is in VRC1(i,j). Next, we add VRC(i,j)=VRC(i,j)+VRC1(i,j), which gives the final answer of v pairs (e+ac−bd, f+ad+bc). This final answer is then stored back from VRC(i,j) in $C_{ReB}$.

In the strict VMX implementation a vector select or permute operation might not be present. In that case, one might be forced to leave the VMX environment. Then, one would store two v pairs (ac,bd) and (bc,ad) from VRC(i,j) and VRC1 (i,j) and do these two selects or permutations operations using scalar operations. Then these values could be reloaded into VRC1(i,j) and the remaining steps above of VMX loading of v pairs of (e, f) adding and storing back the final result can again be done by VMX instructions.

Second Exemplary Embodiment

Figure 4:
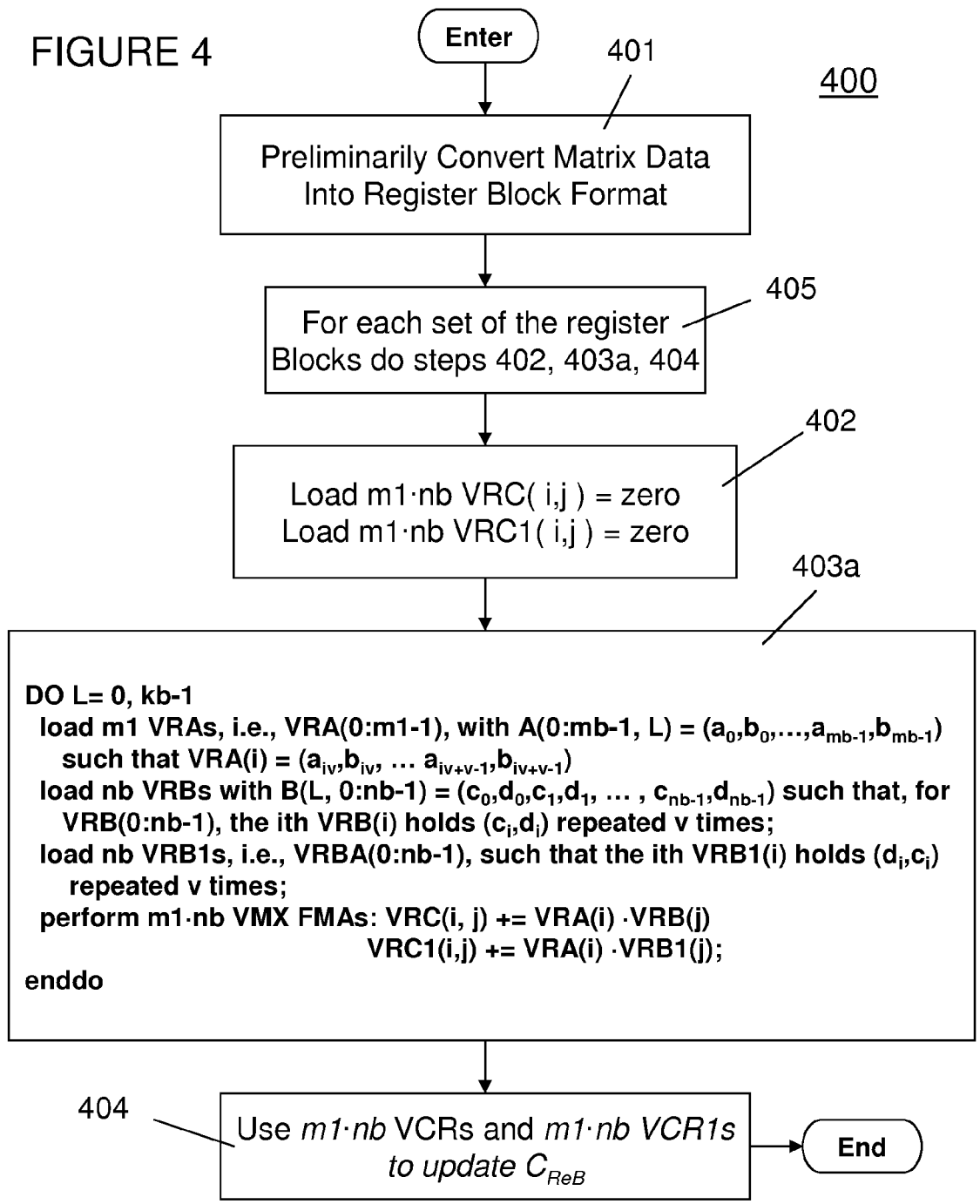
Figure 5:
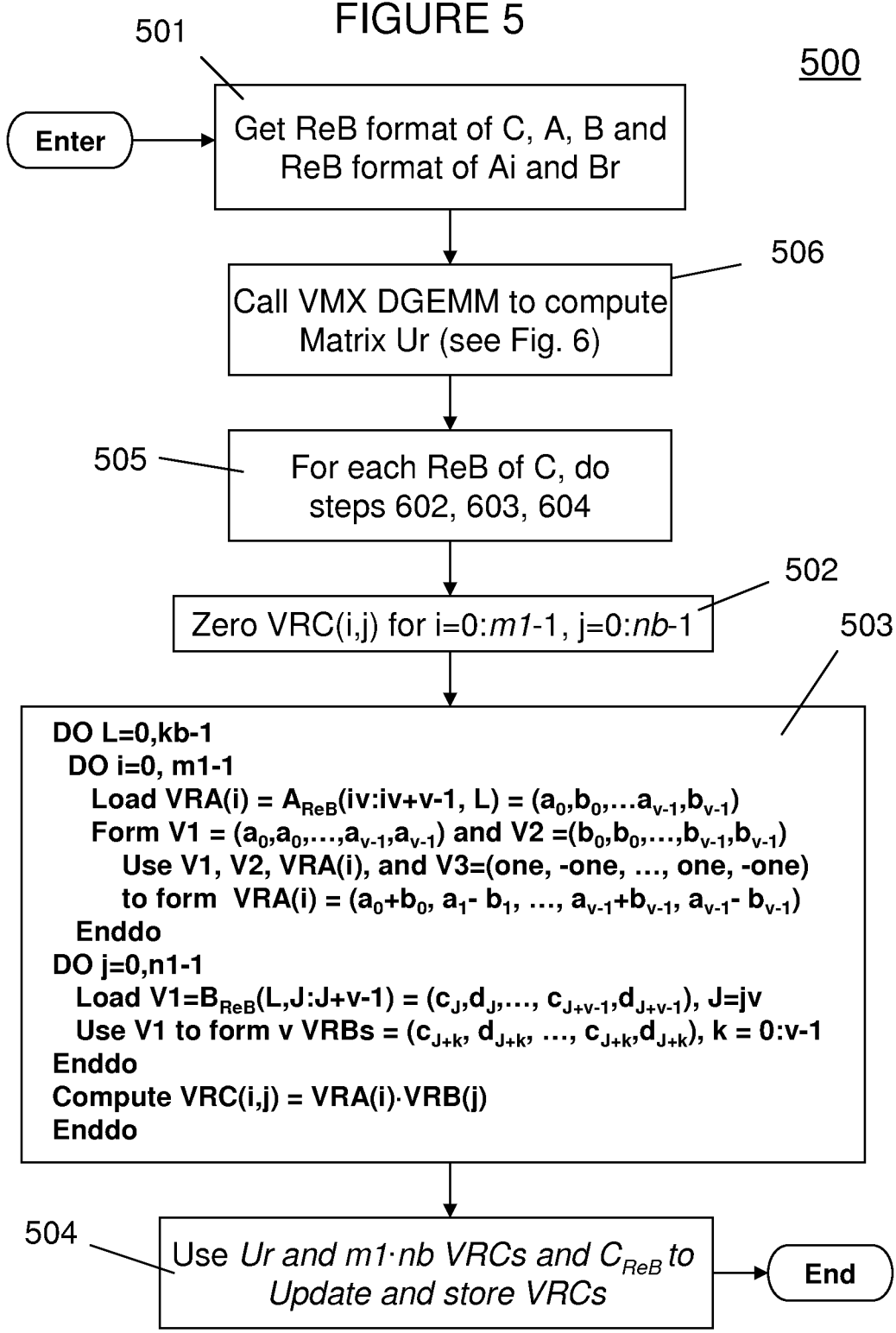
FIG. 5 illustrates a third exemplary embodiment 500 of the present invention.

An embodiment of ways (3) and (4) is almost identical to ways (1) and (2). The major difference between these two ways and ways (1-2) is how the m1*nb VRC's and VRC1's vector registers will get their data from vector registers VRA and VRB. FIG. 4 details the second embodiment. It is similar to FIG. 3. FIG. 4 covers ways (3 and 4).

Consider way (4). Given v pairs (a,b) in a vector register, we want to form v pairs of (a,a) in VRA and v pairs of (b,b) in VRA1 whereas in way (2) we formed form v pairs of (a,b) in VRA and v pairs of (b,a) in VRA1. Way (4) places v products (ac, ad) in VRC and v products (bc,bd) in VRC1. In terms of non-strict VMX we need to form from VR both VRA and VRA1 in the VMX register file. A way to do this is given in load (4) mentioned earlier. Otherwise, for strict VMX we would need to double the size of $A_{ReB}$ in order to directly load VRA and VRA1 from $A_{ReB}$. Box 403b for way (4) only differs from Box 303b for way (2) for what is loaded into VRA and VRA1. A similar conclusion is reached for way (3) in Box 403a and for way (1) in Box 303a. In way (3), nb VRB's get loaded with v pairs VRB(i)=($c_i$, ..., $c_i$), i=0:nb−1 and nb VRB1's get loaded with v pairs VRB1(i)=($d_i$, ..., $d_i$), i=0: nb−1. Again, we have the issue of non-strict VMX and strict VMX which says whether we can form VRB(i) and VRB1(i) from n1*v consecutive elements of row L of $B_{ReB}$. For strict VMX, then like way (1) the size of $B_{ReB}$ gets increased by the factor 2nb. For non-strict VMX we can use instruction (4).

Now consider Box 404 for ways (3) and (4). In way (4) the four products are v pairs (ac,ad) in VRC(i,j) and v pairs (bc,bd) in VRC1(i,j). Instead of the two vector select or perm operations we replace VRC1(i,j) with v pairs (bd,bc). To do this see load (3) given earlier. Then a single VMX FMA VRC(i,j)+=VRC1*VM11 produces v accumulated pairs (ac−bd, ad+bc) of correct results. Now VRC(i,j) holds v pairs correct product results of $A_{ReB}*B_{ReB}$. Next, VRC1(i,j) is loaded with $(e_0, f_0, \ldots, e_{v-1}, f_{v-1})$ which are the corresponding v pairs of $C_{ReB}$. The remaining two vector operations of adding and storing is similar to what was done in FIG. 3, Box 304.

In way (3) the four products are v pairs (ac, bc) in VRC(i,j) and v pairs (ad,bd) in VRC1(i,j). See Box 403a for the very minor differences between Box 403b. Finally, Box 404 in way (4) is identical to Box 404 in way (3).

Third Exemplary Embodiment

Again, we compute C=C+A·B as a series of register block computations. First, we give some preliminary considerations. The scalar form of complex C=C+A*B is $c_{ij}=c_{ij}+a_{i,1}\cdot a_{1j}$ or $$\begin{pmatrix} e \\ f \end{pmatrix} = \begin{pmatrix} e \\ f \end{pmatrix} + \begin{pmatrix} ac-bd \\ ad+bc \end{pmatrix},$$

which requires four multiplies and four adds.

Looking at $$\begin{pmatrix} a \\ b \end{pmatrix} * \begin{pmatrix} c \\ d \end{pmatrix},$$

its real part is ac−bd is also equal to (a+b)c−b(c+d) and its imaginary part ad+bc is also equal to (a−b)d+b(c+d)=ad+bc. Note that this requires five additions and three multiplications, which can be done as follows, where r, s, t, and u are temporary variables:

$r=a+b, s=a-b, t=c+d, u=b\cdot t, e=e+r\cdot c-u,$ and $f=f+s\cdot d+u$.

However, the matrix multiply cost is $2N^3$ flops and the matrix addition cost is $N^2$ flops. So, from a matrix (ZGEMM) point of view, the first method cost $4(2N^3)+4N^2=8N^3+4N^2$, and the second method cost is $7(N^2)+3(2N^3)=6N^3+7N^2$. As one can see, their ratio $1^{st}/2^{nd}=4/3-16/3N^{-1}+O(N^{-2})$. For large N, this gives a 33% speed increase.

This process will be done on a block (sub matrix) level of order NB. Thus, temporary storage of size $4NB^2$ (r, s, t, u) is required. This amount of extra storage is about the same as required by the first embodiment as the first embodiment requires register blocking. It should be noted that the second embodiment also requires register blocking. However, in the course of forming r, s, t, u as matrices one would simultaneously incorporate register blocking.

The original format for ZGEMM is complex format and hence it is not partitioned into real and imaginary matrices. For efficiency, we will therefore keep complex or ZGEMM format as much as possible. Above we had u=bt as a scalar real multiply. We now form its matrix analog. Let Br be the real NB by KB matrix whose (i,j) element is c+d where (c,d) is the (i,j) element of complex matrix B. Problem 1, shows how the matrix Br can be formed efficiently. Let Ai be the real MB by KB matrix whose (i,j) element is b where (a,b) is the (i,j) element of complex matrix A. Problem 2 shows how the matrix Ai can be formed efficiently. Finally, call the DGEMM embodiment described later to compute the real MB by NB matrix Ur=Ai*Br.

We will not form real matrices E, F, R, S which are the matrix analogs of scalars e, f, r, s above. Instead, we keep MB by NB C and MB by KB A as complex matrices. Note that for each (i,j) element of A=(a,b) we can form (a+b,a−b) by vector loading $V=v$ $(a,b)'s=(a_0,b_0, \ldots, a_{v-1}, b_{v-1})$ where v=vL/2. Then we can form $V1=(a_0, a_0, \ldots, a_{v-1}, a_{v-1})$ and $V2=(b_0, b_0, \ldots, b_{v-1}, b_{v-1})$ by two VMX select operations and finally $(a_0+b_0,a_0-b_0, \ldots, a_{v-1}+b_{v-1},a_{v-1}-b_{v-1})$ via V1+=V2*V3 where V3=(one,−one, . . . , one,−one). These last three vector operations are done in the VMX register file after V has been loaded. Detail of producing these four vector operations efficiently are given in the solution of problem 3.

Further note that v (e,f)'s in a VC can be updated by VC+=V1*VB where $VB=(c_i, d_i, \ldots, c_i, d_i)$. Thus, the v scalar operations (e,f)=(e+r*c,f+s*d) can be handled without leaving complex format by a single VMX FMA. In matrix form there are kb of such operations before the final v (−u,u) terms+the initial v (e,f) terms in C_ReB are added to the accumulated sum of kb terms and then this final result of ZGEMM is stored back in $C_{ReB}$. Recall that u=bt. Its real matrix form is Ur=Ai*Br. Let us do a vector load V of a column of Ur giving $(u_0, u_1, \ldots, u_{vL-1})$. For each such load we form two vectors $V1=(u_0, u_0, \ldots, u_{v-1}, u_{v-1})$ and $V2=(u_v, u_v, \ldots, u_{vL-1}, u_{vL-1})$ using two vector select or permutation operations. Then two VMX FMA's are done: VC1+=V1*V4 and VC2+=V2*V4 where V4=(−one, one, . . . , −one, one). Problem 4 shows how these last four vector operations can be done efficiently.

Exemplary key ideas of the third embodiment have now been described. A flow diagram of the above description is given in FIG. 5.

DGEMM Embodiment

Figure 6:
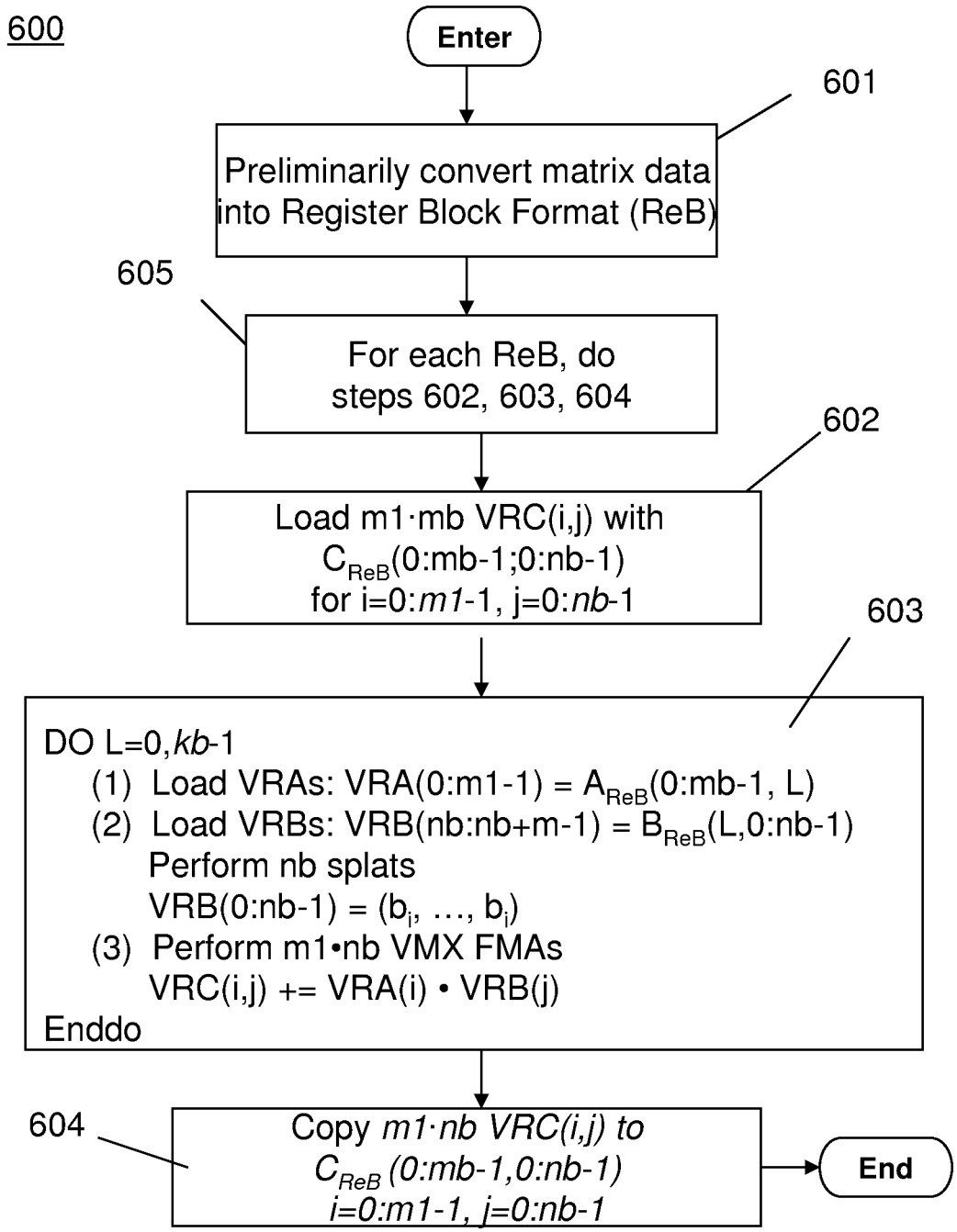
FIG. 6 illustrates a DGEMM kernel exemplary embodiment 600 of the present invention.

The third exemplary embodiment requires a DGEMM computation, $C=C+A*B^T$ where C is M by N, A is M by K and B is N by K. Here, A, B, C are generic real matrices. In this computation, C is initially a zero matrix; A=Ai and B=Br. The values M, N, K are actually values related to the MB, NB and KB of the third embodiment. FIG. 6 details the DGEMM embodiment.

In the third embodiment, we would generate matrices Ai and Br from complex matrices A and B, also in register block format, to be in register block format. There is no problem for real C as initially real C is the zero matrix. Hence, for this application box 601 is accomplished by the third embodiment for matrices Ai and Br. Our DGEMM embodiment in FIG. 6 is really the production of a DGEMM kernel. The DGEMM kernel does a series of register block computations; see box 605.

It therefore suffices to describe a single register block computation which is the execution of boxes 602, 603 and 604 in succession. For box 602, we simply load m1*nb VRC(i,j) for i=0:m1−1 and j=0:nb−1. Here mb=m1*vL and vL is the vector length of the VMX unit. $VR(i,j)=C_{ReB}(i*vL:i*vL+VL-1,j)$.

The main computation now commences in box 603. There is a do loop L=0, kb—1. For each value of L, there are three steps:

(1) load $VRA(i)=A_{ReB}(i*vL:i*vL+VL-1,L)$ for i=0:m1−1,
(2) load. $VRB(nb+j)=B_{ReB}(Lj*vL:j*vL+VL-1)$ for j=0:n1−1 and then do nb VMX loads $VRB(j)=(b_j, \ldots, b_j)$ for j=0:nb−1 and (3) perform VRC(i,j)+=VRA(i)*VRB(j) for i=0:m1−1 and j=0:nb−1.

Finally, box 604 consists of storing the m1*nb VRC's back into $C_{ReB}$. We note that step (2) of box 603 requires a splat operation. See instruction (5) which was described earlier for details. Also, note that for the third embodiment C is initially a zero matrix. Hence, box 602 can be skipped. In its place, we just zero out m1*nb VRC's in the VMX register file.

Vector Scalar GEMM Embodiments

Embodiments one to three for ZGEMM, FIGS. 2 to 5, as well as the embodiment for DGEMM, FIG. 6, can be simplified if a VMX architecture has a vector scalar FMA instruction. If this is the case, then the need for a vector load splat operation for DGEMM and various forms of complex vector load splat operations for ZGEMM are avoided. Currently, vector load splat operations for vL=4 and long precision are difficult to implement in one machine cycle.

It may be possible to combine the combination of vL splats and vL FMA's into a single combined matrix vL by vL FMA operation, or more briefly a matrix FMA operation: Given are vL VC registers holding the C(i:i+vL−1,j:j+vL−1) sub matrix and vectors VA holding the A(i:i+vL−1,L) sub matrix column vector and VB holding the B(L,j:j+vL−1) sub matrix row vector. Form a rank one update C+=AB.

For L=0:kb−1 this would constitute part of the DGEMM kernel. For each L, this consists of doing vL VMX FMAs as a single instruction: VC(i,j)+=VA(i)VB(j). This is an outer product update. For a $C_{ReB}$ matrix of size mb by nb where mb=m1*vL and nb=n1*vL this consists of doing m1*n1 matrix FMAs for each value of L. It is easily seen that a matrix FMA consists of doing vL ordinary VMX FMAa where the A operand is VA used vL times, the B operand is VB(j)=($b_j$, $b_j$, ..., $b_j$) and the C operand is VC(j)=C(0:vL−1,j:j+vL−1), j=0:vL−1.

We now describe the three embodiment changes for ZGEMM, in FIGS. 7, 8, 9 and for DGEMM, in FIG. 10 by using the proposed vector scalar FMA detailed above. We do not give full details. Instead, we only consider on boxes 303, 403, 503 and 603. The overwhelming majority of the FMAs occur in these boxes. Furthermore, we only consider case b of these boxes for ZGEMM and box 603 for DGEMM.

Embodiment 1 for Vector Scalar FMA

Box 703*b*

This embodiment is described in FIG. 7. Here we do vL times vL FMA's as a combined single operation on vL VC registers and single VA and VB registers. All boxes of FIG. 7 are identical to the corresponding boxes of FIG. 3 except box 303 which has two boxes 303*a* and 303*b*. It suffices to describe box 703*b*. We only consider VA(i), i=0:m1−1 and a single VB(j), of j=0:n1−1. In Box 303*b*, one uses v+1 registers and does v "complex splats" for this VB. Here these splats are embedded in the matrix FMA.

To indicate the embedding, we break the implied do loop j=0,nb−1 of 303*b* into two parts j=0,n1−1 and jj=0,v−1. Recall that j is fixed by the assumption above. The do loop over jj extracts the complex operand VB(j) as s(0:1) for later use of doing m1 VMX FMAs where complex s(0:1) is being repetitively used in the nested do loops i=0,m1−1, and ii=0, vL−1.

Embodiment 2 for Vector Scalar FMA

Box 803*b*

This embodiment is described in FIG. 8. Here we do vL times vL FMA's as a combined single operation on vL VC registers and single VA and VB registers. All boxes except boxes of FIG. 8 are identical to the corresponding boxes of FIG. 4 except box 403 which has two boxes 403*a* and 403*b*. It suffices to describe box 803*b*. We only consider VA(i), i=0:m1−1 and a single VB(j), of j=0:n1−1. In Box 403*b*, one uses v+1 registers and does v "complex splats" for this VB. Here these splats are embedded in the matrix FMA. To indicate the embedding, we break the implied do loop j=0, nb−1 of 403*b* into two parts j=0, n1−1 and jj=0, v−1. Recall that j is fixed by the assumption above. The do loop over jj extracts the complex operand VB(j) as s(0:1) for later use of doing m1 VMX FMA's where complex s(0:1) is being repetitively used in the nested do loops i=0, m1−1, and ii=0, vL−1.

Exemplary Embodiment 3 for Vector Scalar FMA

Box 903*b*

This embodiment is described in FIG. 9. Here we do vL times vL FMA's as a combined single operation on vL VC registers and single VA and VB registers. All boxes except boxes of FIG. 9 are identical to the corresponding boxes of FIG. 5 except box 503 which has two boxes 503*a* and 503*b*. It suffices to describe box 503*b*. We only consider VA(i), i=0:m1−1 and a single VB(j), of j=0:n1−1. In Box 503*b*, one uses v+1 registers and does v "complex splats" for this VB. Here these splats are embedded in the matrix FMA. To indicate the embedding, we break the implied do loop j=0,nb−1 of 503*b* into two parts j=0,n−1 and jj=0,v−1. Recall that j is fixed by the assumption above. The do loop over jj extracts the complex operand VB(j) as s(0:1) for later use of doing m1 VMX FMAs where complex s(0:1) is being repetitively used in the nested do loops i=0,m1−1, and ii=0, vL−1.

Embodiment DGEMM for Vector Scalar FMA

Box 1003

This embodiment is described in FIG. 10. Here we do vL times vL FMAs as a combined single operation on vL VC registers and single VA and VB registers. All boxes except boxes of FIG. 10 are identical to the corresponding boxes of FIG. 6 except box 603. It suffices to describe box 603. We only consider VA(i), i=0:m1−1 and a single VB(j), of j=0:n1−1. In Box 603, one uses vL+1 registers and does vL splats. Here these splats are embedded in the matrix FMA. To indicate the embedding, we break the implied do loop j=0,nb−1 of 603*b* into two parts j=0,n1−1 and jj=0,vL−1. Recall that j is fixed by the assumption above. The do loop over jj extracts the operand VB(j) as s for later use of doing m1 VMX FMAs where s is being repetitively used in the nested do loops i=0,m1−1, and ii=0, vL−1.

Exemplary Software Implementation

Figure 11:
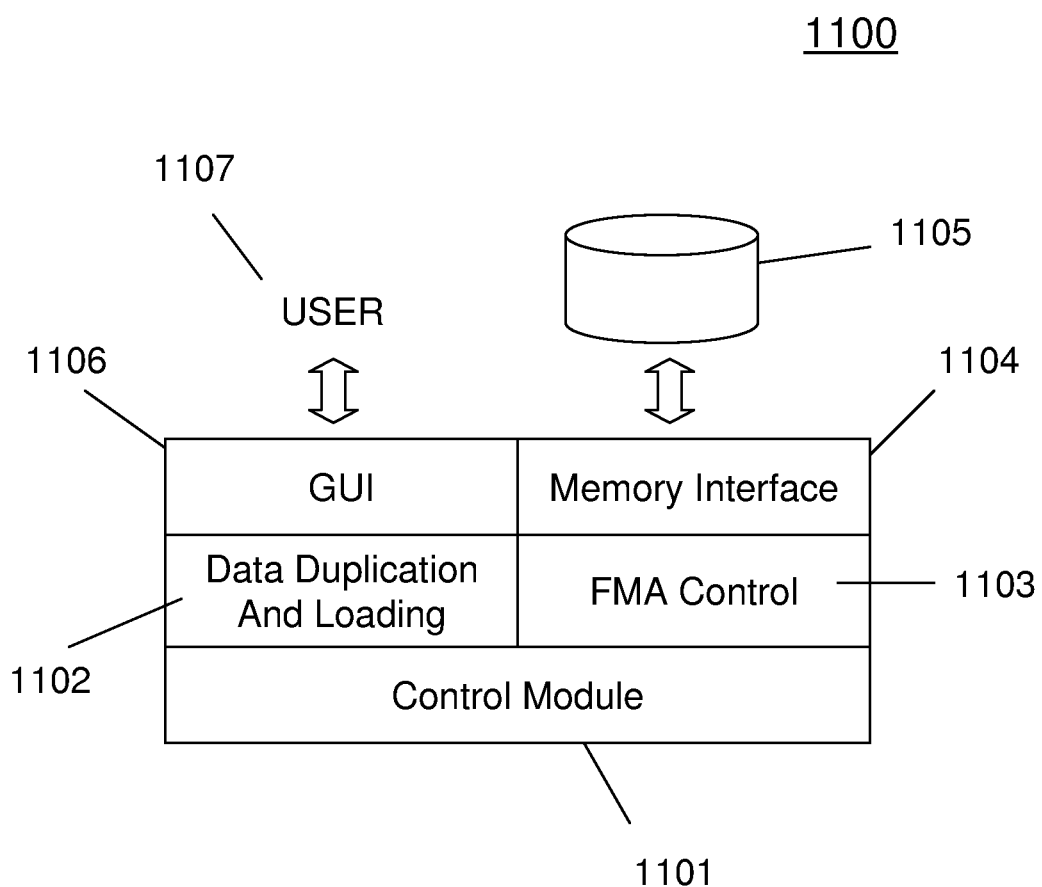
FIG. 11 illustrates an exemplary block diagram of a software module that could be used to implement the method of the present invention.

FIG. 11 illustrates a software implementation 1100 of the present invention, wherein control module 1101 controls the loading of data in one or more of the compound loading instructions previously described, as implemented in data duplication and loading module 1102. FMA control module 1103 would contain the instructions for firing the FMAs to thereinafter execute the multiplication processing. Memory interface module 1104 interfaces with the matrix data stored in memory system 1105, and the memory interface module 1104 can include instructions for preliminarily placing the matrix data in a revised data format that ensures that matrix data will be continuously provided as contiguous data. Graphical user interface (GUI) 1106 permits user 1107 to control the matrix multiplication processing and selectively view or otherwise deal with the results.

Exemplary Hardware Implementation

Figure 12:
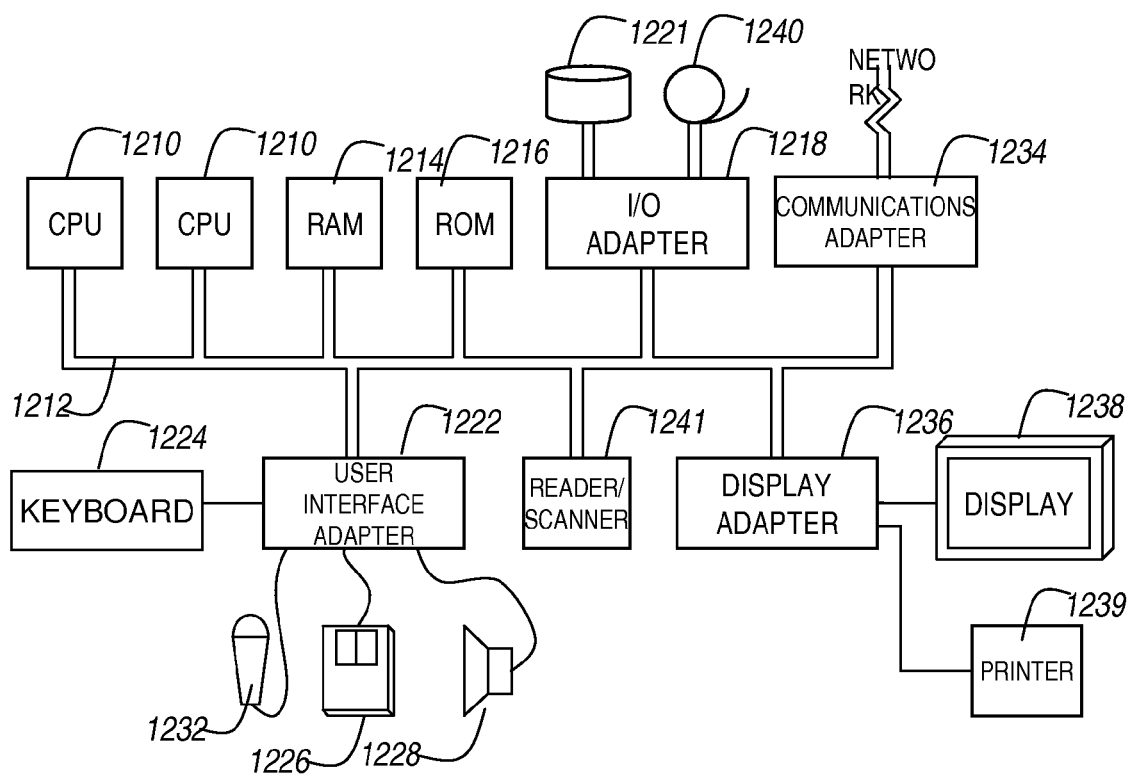
FIG. 12 illustrates an exemplary hardware/information handling system 1200 for incorporating the present invention therein.
Figure 13:
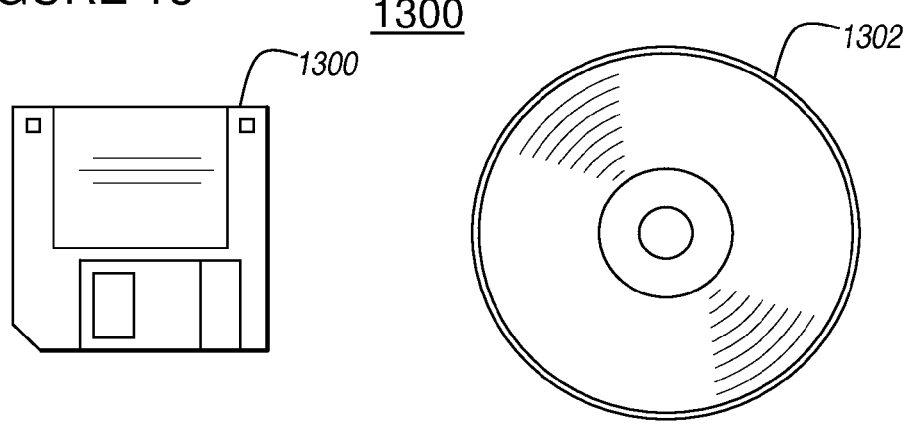
FIG. 13 illustrates a signal bearing storage medium 1300 (e.g., storage medium) for storing steps of a program of a method according to the present invention.

FIG. 12 illustrates a typical hardware configuration of an information handling/computer system in accordance with the invention and which preferably has at least one processor or central processing unit (CPU) 1210.

The CPUs 1210 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1210 and hardware above, to perform the method of the invention.

This signal-bearing media may include, for example, a RAM contained within the CPU 1210, as represented by the fast-access storage for example. Alternatively, the instructions may be contained in another tangible signal-bearing media, such as a magnetic data storage diskette 1300 (FIG. 13), directly or indirectly accessible by the CPU 1210.

Whether contained in the diskette 1300, the computer/CPU 1210, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media, including storage in transmission formats in digital and analog and the use of storage nodes or devices in communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
a memory system to store data to be processed;
a coprocessing unit to perform an intended processing operation on said data;
a set of registers that holds data for said coprocessing unit for said intended processing operation; and
a controller that initially loads input data into said set of registers from said memory system and preliminarily processes said loaded data in said set of registers to achieve an effect on said loaded data that is related to said processing operation prior to said data being presented for said intended processing operation,
wherein said initially loaded data is first loaded and preliminarily processed using an odd data path and said intended processing occurs using an even data path, wherein said odd data path and said even data path sequentially execute within a same machine cycle.

2. The apparatus of claim 1, wherein said effect on said loaded data comprises a simulation of a loading instruction that is unimplemented in an instruction set of said apparatus, wherein said unimplemented loading instruction would load said data into said registers in a format optimal for said intended processing operation.

3. The apparatus of claim 2, wherein said intended processing operation comprises a matrix multiplication operation and said unimplemented loading instruction comprises a loading operation that would selectively load data having a complex component considered to be an "i" component in a manner optimal for calculation of an effect of $i*i=-1$ that results in a real component of a complex multiplication operation.

4. The apparatus of claim 3, wherein said unimplemented loading instruction comprises at least one of:
a Single Instruction Multiple Data (SIMD) vector scalar instruction ($y \leftarrow y+x*s$), x,y indicating matrix data and s indicating a scalar;
a vector cross load instruction with negation (($a,b$)→($b,-a$)); and
a vector cross load instruction without negation (($a,b$)→($b, a$)).

5. The apparatus of claim 1, wherein said initially loaded input data comprises a minimal input data and said preliminary processing selectively augments said minimal input data as necessary for said intended processing operation.

6. The apparatus of claim 1, wherein said initially loaded input data comprises data arranged in said memory system in a register block format, said register block format comprising a non-standard data format wherein data is stored in a format as grouped into blocks intended to be loaded as a unit into said register set rather than being stored in one of a row major and a column major format.

7. The apparatus of claim 1, wherein said coprocessor comprises one or more vector FMAs (fused multiply add units) and said intended operation comprises a matrix multiplication selectively applied either to real matrix data or to complex matrix data.

8. The apparatus of claim 1, wherein said preliminary processing is executed by said controller using a sequence of commands associated with said register set, as including one or more hardware commands for said sequence of commands.

9. The apparatus of claim 1, wherein said preliminary processing is executed by said controller using a sequence of commands associated with said register set, as including one or more software commands for said sequence of commands.

10. The apparatus of claim 9, wherein said one or more software commands comprises one or more of:
- a splat operation;
- a load splat vector operation;
- a complex splat with component interchange;
- an interchange of components operation;
- a complex duplication operation;
- a Vector-Scalar Extension (VSX) xxpermdi instruction; and
- a vperm instruction.

11. The apparatus of claim 1, wherein said initially loaded data is incorrect as data for said intended processing operation and said effect on said loaded data achieves a correction for said data.

12. The apparatus of claim 1, wherein said effect on said loaded data comprises a preloading of data for said intended processing operation, said preloading overcoming a loading penalty in said register set.

13. The apparatus of claim 1, wherein said preliminary processing is achieved as a sequence of instructions that comprises an atomic complex instruction stored in a memory of said controller.

14. A computerized method of performing matrix multiplication, comprising:
using low-level instructions to execute a preliminary processing of input data, as part of a loading of said input data into data registers of a processing or coprocessing unit of a computer that will execute said matrix multiplication, said input data representing complex data having both a real component and an imaginary component considered to be an "i" component, said low-level instructions performing a preliminary processing in said data registers that places said loaded input data into a format so that a negation effect will be achieved during said matrix multiplication, said negation effect occurring in a real component of a complex number multiplication, as resulting from multiplying i·i=−1, said preliminary processing providing said format in an absence of a single data loading instruction capable of placing said data into said format for said negation effect during said complex number multiplication; and
subsequently executing, in said processing or coprocessing unit, said matrix multiplication using said processed input data.

15. The method of claim 14, further comprising preliminarily placing said data into a non-standard data structure that will present said data in a contiguous manner during processing of said complex matrix multiplication in accordance with loading into said data registers.

16. The method of claim 14, as tangibly embodied on a computer-readable medium as a program of machine-readable instructions executable by a digital processing apparatus.

17. The method of claim 16, wherein said computer-readable medium comprises at least one of:
- a memory in a computer storing said instructions as an executable program;
- a memory in said computer storing said instructions as being currently executed by said computer;
- a stand alone diskette of instructions to be loaded into said computer; and
- a memory on another computer in a network, to be downloaded into said computer.

18. The method of claim 14, as executed on a machine having no loading instruction that would directly load matrix data for matrix multiplication processing.

19. The method of claim 18, wherein said processing or coprocessing units are coordinated as a SIMD (single instruction multiple data) machine in a manner to perform matrix multiply multiplication on said SIMD units as a SIMD vector unit for either real or complex matrix data processing.

20. The method of claim 19, each of said processing or coprocessing units being selectively controllable to perform matrix processing, each said processing or coprocessing unit using data registers to selectively store data for A, B, and C matrix data for said matrix processing, thereby providing at least one SIMD vector unit, further comprising optimally performing matrix multiply multiplication on said SIMD vector unit.

21. A method of overcoming an implementation limitation on a computer wherein there is no single hardware loading instruction that would optimally load complex data into data registers for a complex vector multiplication processing, said method comprising:
preliminarily processing input data using low-level instructions as part of a loading of said input data into data registers of a processing or coprocessing unit of said computer that will execute said complex vector multiplication processing, said input data representing complex data having both a real component and an imaginary component considered to be an "i" component, said low-level instructions performing a preliminary processing in said data registers that places said loaded input data into a format so that a negation effect will be achieved during said matrix multiplication, said negation effect occurring in a real component of a complex number multiplication, as resulting from multiplying i·i=−1, said preliminary processing providing a format having an effect of said optimally loading said complex data into said data registers.

22. The method of claim 21, wherein said computer comprises a SIMD (single instruction, multiple data) machine having a plurality of FMA (fused multiplication add) units controlled together to form a vector FMA.

23. The method of claim 21, further comprising preliminarily processing said input data to be in a non-standard data format for said loading processing.

24. The method of claim 21, wherein said single hardware loading instruction that is missing comprises at least one of:
- a scalar fused multiply add load instruction;
- a cross load instruction; and
- a negative butterfly load instruction.

* * * * *